US011838138B2

(12) United States Patent
Sabella et al.

(10) Patent No.: US 11,838,138 B2
(45) Date of Patent: Dec. 5, 2023

(54) MULTI-ACCESS EDGE COMPUTING (MEC) BILLING AND CHARGING TRACKING ENHANCEMENTS

(71) Applicant: Intel Corporation, Santa Clara, CA (US)

(72) Inventors: Dario Sabella, Gassino (IT); Ned M. Smith, Beaverton, OR (US); Neal Oliver, Portland, OR (US); Kshitij Arun Doshi, Tempe, AZ (US); Suraj Prabhakaran, Aachen (DE); Miltiadis Filippou, Munich (DE); Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/534,132

(22) Filed: Nov. 23, 2021

(65) Prior Publication Data

US 2022/0191051 A1    Jun. 16, 2022

Related U.S. Application Data

(63) Continuation of application No. 16/235,894, filed on Dec. 28, 2018, now Pat. No. 11,212,124.
(Continued)

(51) Int. Cl.
*H04L 12/14* (2006.01)
*H04L 67/1087* (2022.01)
(Continued)

(52) U.S. Cl.
CPC .......... *H04L 12/1407* (2013.01); *H04L 67/10* (2013.01); *H04L 67/1074* (2013.01);
(Continued)

(58) Field of Classification Search
None
See application file for complete search history.

(56) References Cited

U.S. PATENT DOCUMENTS

| 11,212,124 B2 | 12/2021 | Sabella et al. |
| 2003/0187531 A1 | 10/2003 | Circenis et al. |

(Continued)

FOREIGN PATENT DOCUMENTS

| DE | 102019123244 | 4/2020 |
| WO | 2009078874 | 6/2009 |

(Continued)

OTHER PUBLICATIONS

U.S. Appl. No. 16/235,894, U.S. Pat. No. 11,212,124, filed Dec. 28, 2018, Multi-Access Edge Computing (MEC) Billing and Charging Tracking Enhancements.

(Continued)

*Primary Examiner* — Tonia L Dollinger
*Assistant Examiner* — Ishrat Rashid
(74) *Attorney, Agent, or Firm* — Schwegman Lundberg & Woessner, P.A.

(57) ABSTRACT

An architecture to allow Multi-Access Edge Computing (MEC) billing and charge tracking, is disclosed. In an example, a tracking process, such as is performed by an edge computing apparatus, includes: receiving a computational processing request for a service operated with computing resources of the edge computing apparatus from a connected edge device within the first access network, wherein the computational processing request includes an identification of the connected edge device; identifying a processing device, within the first access network, for performing the computational processing request; and storing the identification of the connected edge device, a processing device identification, and data describing the computational pro- (Continued)

cesses completed by the processing device in association with the computational processing request.

24 Claims, 13 Drawing Sheets

Related U.S. Application Data

(60) Provisional application No. 62/739,265, filed on Sep. 30, 2018.

(51) Int. Cl.
*H04L 67/1074* (2022.01)
*H04M 15/00* (2006.01)
*H04L 67/10* (2022.01)
*H04L 67/12* (2022.01)
*H04W 4/24* (2018.01)

(52) U.S. Cl.
CPC .......... *H04L 67/1087* (2013.01); *H04L 67/12* (2013.01); *H04M 15/66* (2013.01); *H04M 15/8353* (2013.01); *H04M 15/84* (2013.01); *H04M 15/85* (2013.01); *H04M 15/852* (2013.01); *H04M 15/853* (2013.01); *H04M 15/886* (2013.01); *H04W 4/24* (2013.01)

(56) References Cited

U.S. PATENT DOCUMENTS

| | | | |
|---|---|---|---|
| 2004/0247100 A1 | 12/2004 | Hakala et al. | |
| 2006/0143098 A1* | 6/2006 | Lazaridis | H04W 4/24 705/34 |
| 2010/0098021 A1 | 4/2010 | Stammers et al. | |
| 2010/0169489 A1* | 7/2010 | Akiyama | G06Q 30/0645 705/40 |
| 2014/0273943 A1* | 9/2014 | Wu | H04L 12/1485 455/406 |
| 2014/0298349 A1* | 10/2014 | Jackson | G06F 1/3206 718/104 |
| 2016/0094410 A1* | 3/2016 | Anwar | H04L 67/1097 709/223 |
| 2017/0237863 A1* | 8/2017 | Frydman | H04M 15/61 455/406 |
| 2017/0250855 A1* | 8/2017 | Patil | H04L 47/827 |
| 2018/0027058 A1* | 1/2018 | Balle | G11C 5/02 709/226 |
| 2019/0158300 A1 | 5/2019 | Sabella et al. | |

FOREIGN PATENT DOCUMENTS

| | | | | |
|---|---|---|---|---|
| WO | WO-2009078874 A1 * | 6/2009 | | G06Q 30/04 |
| WO | WO-2011012170 A1 * | 2/2011 | | H04L 29/12132 |
| WO | 2016134772 | 9/2016 | | |
| WO | WO-2016134772 A1 * | 9/2016 | | H04L 12/1407 |

OTHER PUBLICATIONS

"Multi-access Edge Computing (MEC); Framework and Reference Architecture", Draft ETSI GS MEC 003 V2.0.3, (Aug. 2018), 20 pgs.
"U.S. Appl. No. 16/235,894, Non Final Office Action dated Aug. 19, 2020", 15 pgs.
"U.S. Appl. No. 16/235,894, Response filed Nov. 19, 2020 to Non Final Office Action dated Aug. 19, 2020", 12 pgs.
"U.S. Appl. No. 16/235,894, Final Office Action dated Dec. 17, 2020", 16 pgs.
"U.S. Appl. No. 16/235,894, Response filed Mar. 16, 2021 to Final Office Action dated Dec. 17, 2020", 12 pgs.
"U.S. Appl. No. 16/235,894, Non Final Office Action dated Apr. 2, 2021", 17 pgs.
"U.S. Appl. No. 16/235,894, Response filed Jul. 2, 2021 to Non Final Office Action dated Apr. 2, 2021", 13 pgs.
"U.S. Appl. No. 16/235,894, Notice of Allowance dated Jul. 28, 2021", 8 pgs.
"U.S. Appl. No. 16/235,894, 312 Amendment filed Oct. 27, 2021", 8 pgs.
"U.S. Appl. No. 16/235,894, PTO Response to Rule 312 Communication dated Dec. 3, 2021", 2 pgs.

\* cited by examiner

MULTI-ACCESS EDGE COMPUTING (MEC) BILLING AND CHARGING TRACKING ENHANCEMENTS

CROSS-REFERENCE TO RELATED APPLICATION

This patent application is a continuation of U.S. application Ser. No. 16/235,894, filed Dec. 28, 2018, which claims the benefit of U.S. Provisional Patent Application No. 62/739,265, filed Sep. 30, 2018, entitled "MULTI-ACCESS EDGE COMPUTING (MEC) BILLING AND CHARGING TRACKING ENHANCEMENTS", which is incorporated by reference herein in its entirety.

TECHNICAL FIELD

Embodiments described herein generally relate to data processing, network communication, and communication system implementations, and in particular, to techniques for establishing and implementing communications and functionality in multi-access edge computing (MEC) and Internet of Things (IoT) device networks.

BACKGROUND

IoT devices are physical or virtualized objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Multi-access Edge Computing (MEC) offers application developers and content providers cloud-computing capabilities and an IT service environment at the edge of the network. This environment is characterized by ultra-low latency and high bandwidth as well as real-time access to radio network information that may be leveraged by applications. MEC technology permits operators to flexibly and rapidly deploy innovative applications and services towards mobile subscribers, enterprises and vertical segments.

The deployment of IoT devices and MEC services have introduced a number of advanced use cases and scenarios occurring at the edge of the network. However, these advanced use cases have also introduced a number of corresponding technical challenges relating to security, processing and network resources, service availability and efficiency, among many other issues.

Vehicle-to-everything (V2X) is an important scenario being actively considered as an implementation of Edge, MEC, and IoT technologies. V2X communications featuring short-range direct communication between vehicles is currently supported by two radio access standards, (1) Third Generation Partnership Project (3GPP) Long Term Evolution (LTE) cellular V2X (C-V2X), and (2) Institute of Electrical and Electronics Engineers (IEEE) 802.11p based Dedicated Short-Range Communication (DSRC), which is also specified in Europe as European Telecommunications Standards Institute (ETSI) Intelligent Transport System (ITS)-G5. Both systems are defined independently of each other and have no provisions for interoperability.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1A:
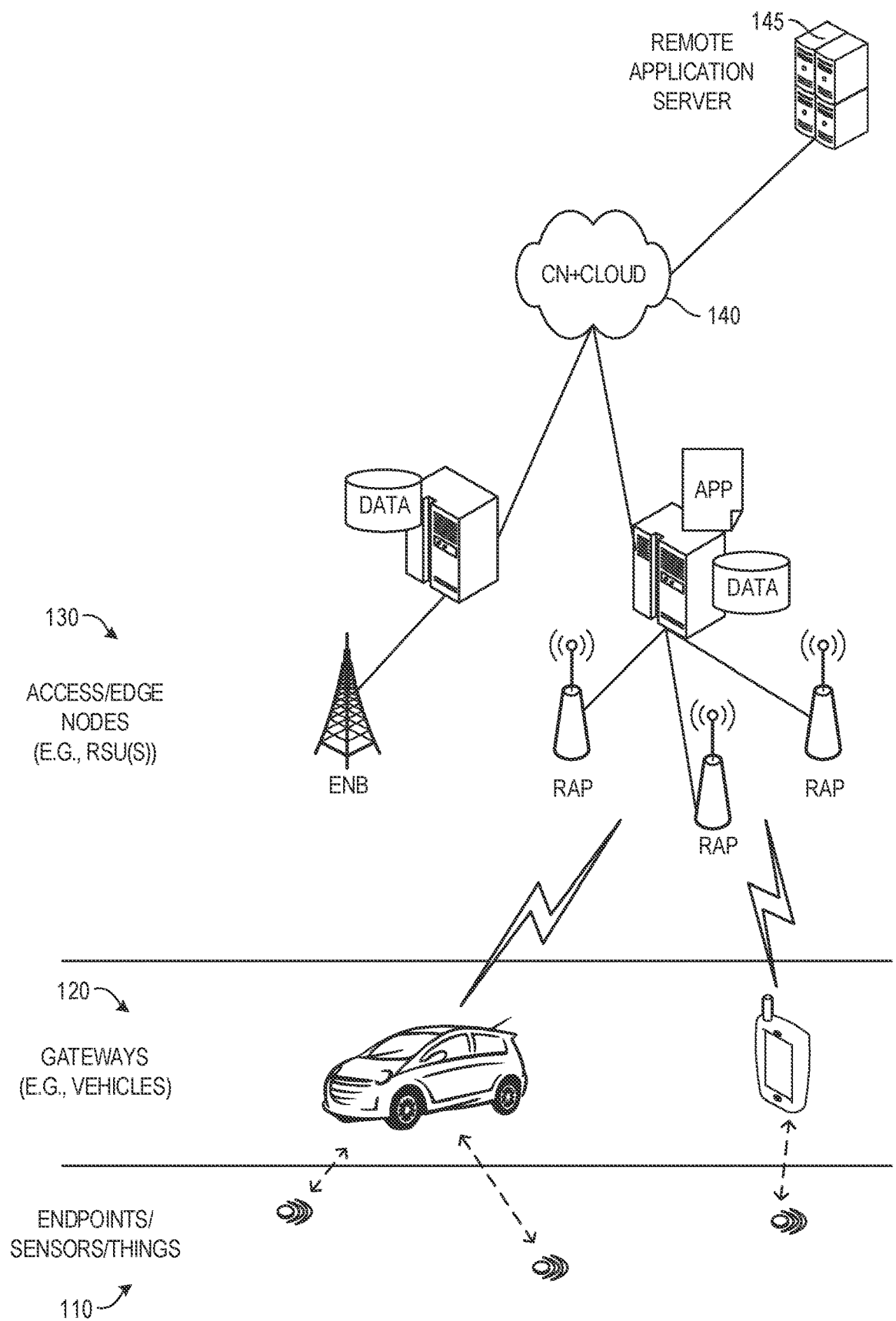
FIG. 1A illustrates devices and network entities in a multi-access communications environment.

In the following description, methods, configurations, and related apparatuses are disclosed for implementing and improving charging and billing features in a MEC system, to enable new usage models, especially involving multiple tenants, with MEC services and edge computing communication architectures. The following examples introduce charging and billing functions in the context of a MEC roaming scenario, including features which enable the tracking of MEC consumed resource utilization (e.g., storage capacity, memory, together with networking resources relevant to the hosting Radio Access Network (RAN)). This enables an approach for a MEC system to support billing and charging that is specifically tailored to features of distributed computing environments and collaboration environments.

The use of distributed computing nodes and mobile networking services in edge computing scenarios provides a volatile scenario where users may move from place to place, and has not been fully addressed by existing billing or monitoring approaches. As the user moves from place to place and the user equipment (UE) may access resources provided by different tenants. Depending on the location and tenants available, a UE may use multiple or non-preferred tenants to access the resources requested. A tenant may be any individual device or virtual device providing a service or resource. Further, the use of orchestration from edge computing scenarios also provides complexity for billing and tracking that are not yet addressed in MEC system deployments.

Traditional roaming agreements ensure a customer of a first operator may enter the network of a second operator, while maintaining an end-to-end connection with a second customer of a third operator. Roaming agreements federate customer identifiers (i.e. phone numbers), billing accounts, and levels of service a customer agrees to pay. Operators may agree to provide similar levels of service to roaming customers (e.g. not a direct customer of the operator) at a price pre-negotiated through roaming agreements.

A challenge associated with roaming agreements is the collection and distribution of telemetry data associated with each of the customers. In many scenarios, telemetry is held internal to the operator network. Telemetry is traditionally associated with the network of the operator rather than associated on a per-tenant granularity. Telemetry data may be any traceable or recordable data concerning the operation and communication of devices and equipment in a network environment. Telemetry data may include network status relating to bandwidth utilization, collision rate, latency, jitter and the like; hosting environment status including resource utilization, CPU, memory, storage, IO, power; management services status including orchestration, device lifecycle, security, software update and the like. Accounting for the telemetry associated with each tenant makes it more difficult for roaming agreements to account and bill for telemetry exchanged between operators. Additionally, MEC roaming agreements may require information on the use of MEC system resources in the hosted network. As a result, existing approaches are unable to address many aspects of billing, charging, and utilization monitoring.

The following discusses a MEC-based framework and set of functional enhancements that enable billing capabilities for anywhere in the MEC architecture where there is a tenant activity "slice". In an example, this approach includes the establishment of a type of HAL (Hardware Abstraction Layer) that provides suitable telemetry to support the tracking of chargeable events in MEC systems. The HAL may be implemented for instance in billing functionality of the platform and included as extension of converge telemetry architecture.

Also, the following includes features to identify a model, API, or other functionality (e.g. chargeable events) regarding elements that may be filtered at a subscription level, in a common data format. Such filtering may reveal the degree of the MEC system resources' utilization. Further, this approach provides the ability in the MEC orchestration layer to store or manage historical information of an application's (per-tenant) resource utilization/telemetry in a data format that may be used for projecting costs for future requests.

In an example, the following incorporates telemetry attributes that are associated with tenant workloads, activities and resources with fine granularity. For example, a workload that is expected to occupy 100 CPU cycles may define a set of CPU performance counters that monitor the CPU across the 100 cycles. Performance counters may measure the specific set of CPU resources used, heat generated, and power consumed. The performance counter log is associated with the workload results in the form of tenant-specific-telemetry data. The platform architectures may be extended to make this approach more powerful by extending performance telemetry counters to include a field that represents a tenant identification for such performance counters. The tenant identification may be represented by N bits that may convey information to identify operator, the specific tenant, or other identifiers of the resource.

The present techniques and configurations may be utilized in connection with many aspects of current networking systems. Roaming agreements, for instance, may anticipate the existence of tenant-specific-telemetry and therefore may negotiate a billing policy that compensates the tenant and home operator accordingly. For example, telemetry data may be used by the acquirer, or customer, to detect anomalies affecting a workload being performed by the UE belonging to the acquirer. Such telemetry data has value to the acquirer as it may better allow security risk mitigations, such that the acquirer may be willing to purchase the telemetry from the home operator (or visited operator).

In return for allowing tenant-specific-telemetry collection, the operator may offer subscription fee discounts to the tenant. Furthermore, the telemetry attributes of an application for a tenant may be stored in a data format that allows the MEC orchestrator to perform lookup operations of individual charged events, basic performance characteristics, and utilization characteristics (beyond telemetry). This functionality may enable the MEC host to provide cost estimations for a given application request and provide negotiability between the UE and the MEC server. For example, a UE may request a cost estimation for a service request through the Mx2 interface and use the estimation response to decide whether or not to use the MEC server.

The present techniques and configurations may provide significant benefits to MEC architectures and other Internet-of-Things (IoT) device network architectures involving any number of edge computing devices or fog computing platforms. The present techniques and configurations specifically may be (but are not required to be) relevant to the standards and approaches published in ETSI GS MEC 003 "Mobile Edge Computing (MEC); Framework and Reference Architecture" (e.g., V2.0.3) and related network or MEC operational implementations.

Moreover, the techniques discussed herein may be relevant to a variety of stakeholders in a telecommunications ecosystem. In fact, billing and charging mechanisms are essential to stimulate the exploitation of MEC system deployments by different entities, such as: Mobile Network Operators (MNOs) that plan to offer their infrastructure to application providers; Infrastructure owners and tower companies, MEC platform vendors, system integrators, and application developers that will be even stimulated to produce such equipment and services for higher level applications. Further, as discussed in the following, the present techniques enable finer grain telemetry monitoring among these entities and hardware, allowing better and more accurate billing schemes.

The following provides a detailed discussion of these techniques within MEC systems and services, applicable to the larger context of Internet of Things (IoT), fog network, and edge computing deployments. It will be understood that the disclosed MEC system and service deployment examples provide one illustrative example of a fog device or fog system, but that many other combinations and layouts of devices and systems located at the edge of a network may be provided. Further, the techniques disclosed herein may relate to other IoT and network communication standards and configurations, and other intermediate processing entities and architectures.

FIG. 1A illustrates devices and network entities in a multi-access communications environment. FIG. 1 specifically illustrates the different layers of communication occurring within the environment, starting from endpoint sensors or things 110 (e.g., operating in an IoT network topology); increasing in sophistication to gateways (e.g., vehicles) or intermediate nodes 120, which facilitate the collection and processing of data from endpoints 110; increasing in processing and connectivity sophistication to access or edge nodes 130 (e.g., road-side units operating as edge computing nodes), such as may be embodied by base stations (eNBs), roadside access points (RAPs) or roadside units (RSUs), nodes, or servers; and increasing in connectivity and processing sophistication to a core network or cloud setting 140. Indeed, the processing at the core network or cloud setting 140 may be enhanced by network services as performed by a remote application server 145 or other cloud services.

As shown, in the scenario of FIG. 1A, the endpoints 110 communicate various types of information to the gateways or intermediate nodes 120; however, due to the mobility of the gateways or intermediate nodes 120 (such as in a vehicle or mobile computing device) this results in multiple access points or types of access points being used for network access, multiple distinct services and servers being used for computing operations, multiple distinct applications and data being available for processing, and multiple distinct network operations being offered as the characteristics and capabilities of the available network services and network pathways change. In particular, the dynamic nature of V2X, Vehicle-to-Vehicle (V2V) and Vehicle-to-Infrastructure (V2I) usage from vehicle UEs or human-operated portable UEs (e.g., mobile smartphones and computing devices) introduces significant complexity for network usage.

Figure 1B:
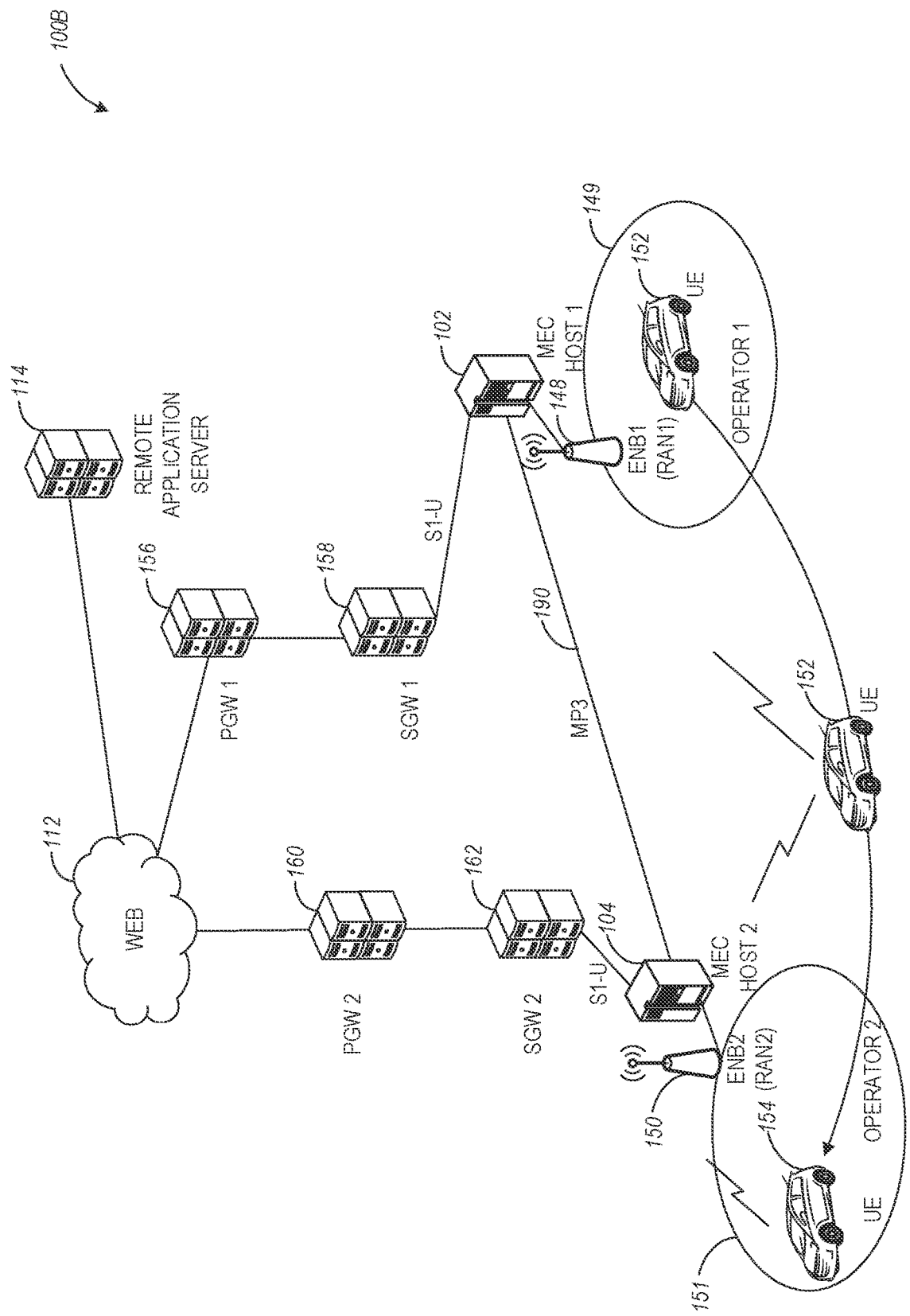
FIG. 1B illustrates a C-V2X communication infrastructure with separate core networks and separate MEC hosts coupled to corresponding radio access networks, according to an example.

FIG. 1B illustrates a C-V2X communication infrastructure 100B with separate core networks and separate MEC hosts coupled to corresponding radio access networks, according to an example. Referring to FIG. 1B, in the C-V2X communication infrastructure 100B each of the MEC hosts 102 and 104 in infrastructure 100B is coupled to a separate core network. More specifically, MEC host 102 is coupled to a first core network that includes a serving gateway (S-GW or SGW) 158 and a packet data network (PDN) gateway (P-GW or PGW) 156. MEC host 104 is coupled to a second core network that includes SGW 162 and PGW 160. Both core networks may be coupled to the remote application server 114 via the network 112. As illustrated in FIG. 1B, MEC hosts 102 and 104 may be coupled to each other via a MEC-based interface 190, which may include a MP3 interface or another type of interface. Additionally, the MEC hosts may be located on the S1 interfaces of the core networks, downstream between the core network and the corresponding RANs of eNBs 148 and 150. In some aspects and as illustrated in FIG. 1B, UEs 152 and 154 may be located within vehicles or other mobile devices.

Figure 1C:
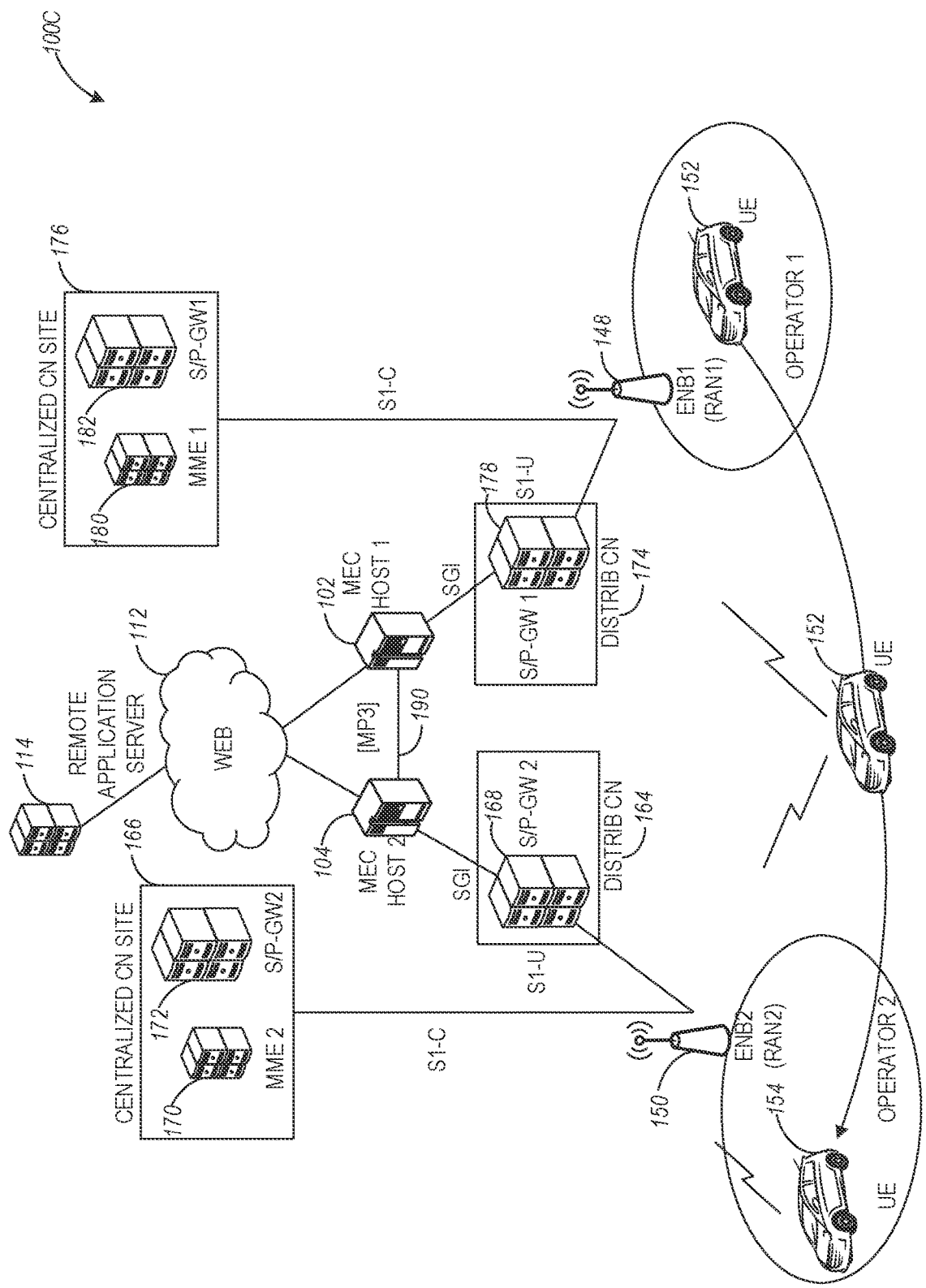
FIG. 1C illustrates a C-V2X communication infrastructure with separate MEC hosts coupled to separate distributed core networks, according to an example.

FIG. 1C illustrates a C-V2X communication infrastructure 100C with separate MEC hosts coupled to separate distributed core networks, according to an example. In some aspects, each of the MEC hosts 102, 104 in infrastructure 100C is coupled to a corresponding SGi interface associated with separate distributed core networks. More specifically, MEC host 102 is coupled to a first distributed core network 174 that includes SGW/PGW 178. MEC host 104 is coupled to a second distributed core network 164 that includes SGW/PGW 168. Both distributed core networks may be coupled to the remote application server 114 via SGi interfaces with the MEC hosts 102, 104 and the network 112. As illustrated in FIG. 1C, MEC hosts 102 and 104 may be coupled to each other via a MEC-based interface 190, which may include a Mp3 interface or another type of interface.

Additionally, the RANs associated with eNBs 148, 150 may be coupled to corresponding centralized core networks 176 and 166. Centralized core network (CN) 166 may include MME 170 and SGW/PGW 172, while centralized CN 176 may include MME 180 and SGW/PGW 182. In some aspects and as illustrated in FIG. 1C, UEs 152 and 154 may be located within vehicles or other mobile devices.

Figure 2:
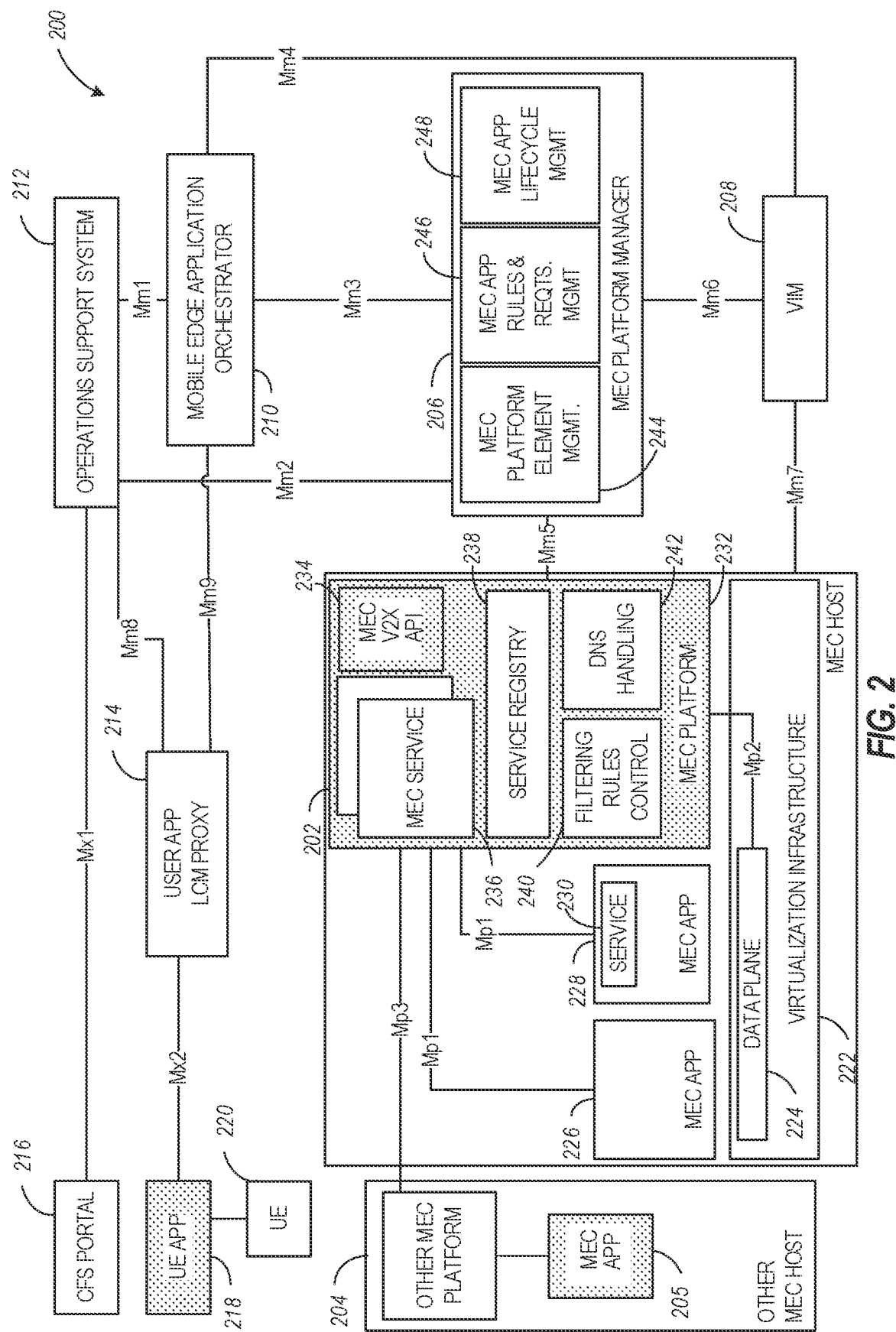
FIG. 2 depicts a block diagram for an example Multi-access Edge Computing (MEC) system architecture.

FIG. 2 depicts a block diagram for an example Multi-access Edge Computing (MEC) system architecture. In an example, the MEC system architecture may be defined according to a specification, standard, or other definition (e.g., according to the ETSI ISG MEC-003 specification). In this diagram, Mp reference points refer to MEC platform functionality; Mm reference points refer to management; and Mx refers to connections to external entities.

Referring to FIG. 2, the MEC network architecture 200 can include MEC hosts 202 and 204, a virtualization infrastructure manager (VIM) 208, a MEC platform manager 206, a MEC orchestrator 210, and operations support system 212, a user app proxy 214, a UE app 218 running on UE 220, and CFS portal 216. Use traffic may be received at the MEC host 202 via the data plane 224 of the virtualization infrastructure 222. The MEC host 202 can include a MEC platform 232 with filtering roles control module 240, DNS handling module 242, service registry 238, and MEC services 236. The MEC platform 232 can instantiate MEC apps 226 and 228, with MEC app 228 providing one or more services 230. The MEC platform manager 206 can include MEC platform element management module 244, MEC app rules and requirements management module 246, and MEC app lifecycle management module 248. The functionalities of the various entities within the MEC architecture 200 can perform functionalities as disclosed by the ETSI GS MEC-003 specification.

MEC architectures offers application developers and content providers cloud-computing capabilities and an IT service environment at the edge of the network. This environment is characterized by ultra-low latency and high bandwidth as well as real-time access to radio network information that may be leveraged by applications. MEC technology permits to flexible and rapid deployment of innovative applications and services towards mobile subscribers, enterprises and vertical segments. For instance, in automotive settings, applications such as V2X (vehicle-to-everything, IEEE 802.11p based or 3GPP LTE-V2X based) may use MEC technology to exchange data, provide data to aggregation points, and access data in databases to provide and obtain an overview of the local situation derived from a multitude of sensors (by various cars, roadside units, etc.).

With prior approaches, including those supported by existing telecommunication and internet service providers, a very coarse granularity is offered as a means to track and bill the resources being used by a particular tenant. This may only be indicated from the tracking of an amount of data transferred, minutes used, or number of processing cycles used (e.g., tenant A from Operator 1 is using 100 cycles of core A in Operator 2 infrastructure). Given the vague nature of these measurements, there is a need to enhance the current platform telemetry architecture in order to convey more information that may be used to enable more fine-grained performance counter monitoring, and mapping the subset of the resources being utilized to actual tenants. In the spectrum of 5G and edge computing where resources will likely be shared by multiple tenants, having such capabilities will be critical. None of the existing solutions consider this approach and tailor it to the software architecture.

In the context of a MEC system (such as the MEC system depicted in FIG. 2) the present techniques and configurations provide a type of Hardware Abstraction Layer implemented via a telemetry utilization system having suitable telemetry functionality to support the tracking of billing and charging details in MEC systems. In an example, this telemetry utilization system may be adapted to identify a model, API, or other functionality (e.g. chargeable events) regarding elements that may be filtered at a subscription level, in a common data format; such filtering will reveal the degree of MEC system resources' utilization. The proposed telemetry utilization system may also be used for projecting cost estimations for a given service request before the service is run and enables negotiability between the client and the MEC host over the Mx2 interface.

The present techniques and configurations enable a potential extension of platform telemetry architectures in order to perform more fine-grained resource monitoring, at a per-edge-tenant level, and expose such functionalities to the MEC architecture. Tenant definition may be performed in the MEC architecture in a hierarchical way. Further, information about the operators or tenant within the operator may be included as part of an identifier.

Figure 3:
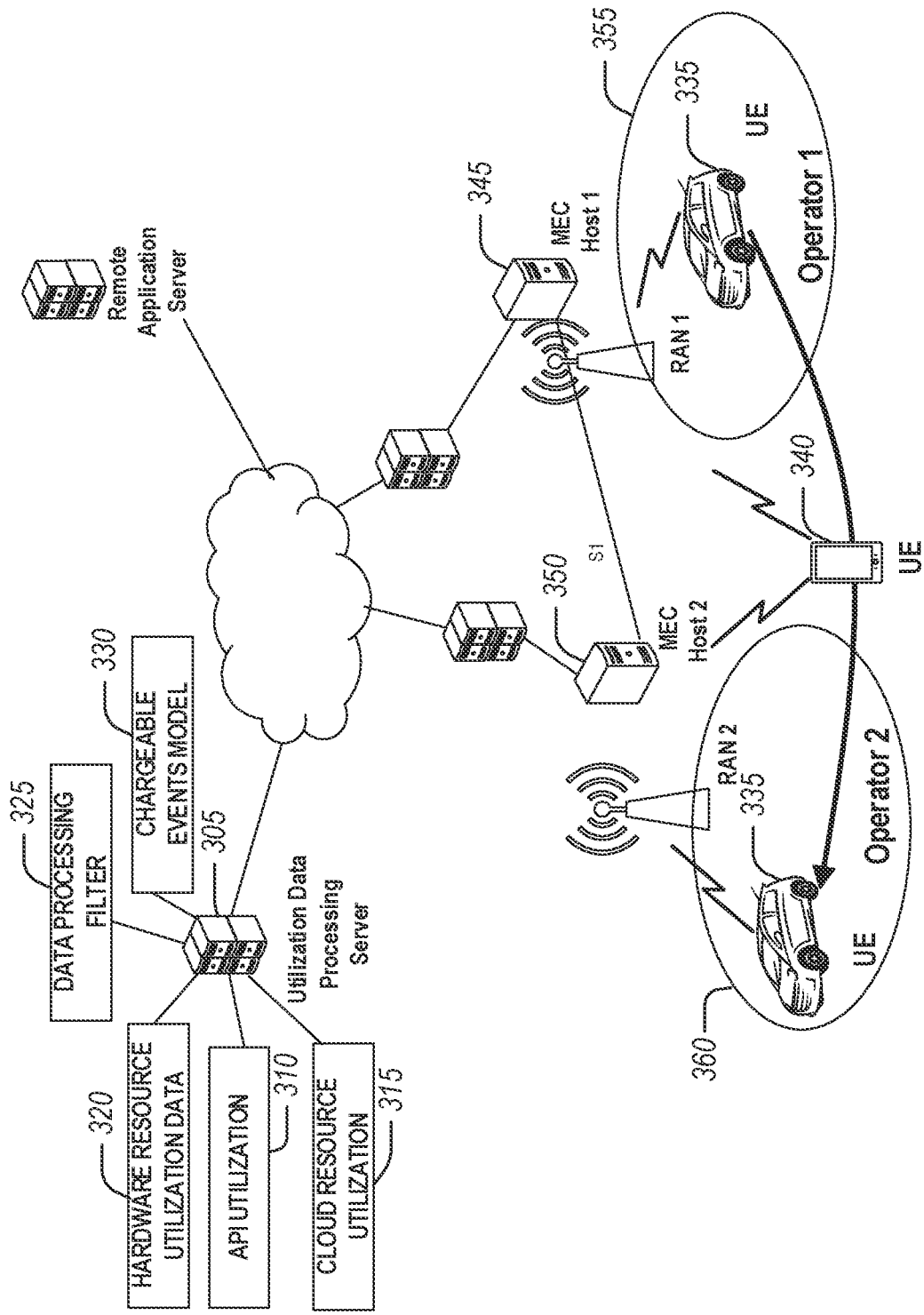
FIG. 3 illustrates an example of a telemetry utilization system collecting data for billing and charging based on usage of a MEC platform, in accordance to an embodiment.

FIG. 3 illustrates an example of a telemetry utilization system collecting data for billing and charging based on usage of a MEC platform, in accordance to an embodiment. This diagram illustrates a system in which a utilization data processing server 305 is connected to other devices, servers, and systems of the MEC platform. This utilization data processing server 305 performs a number of functions to transform telemetry data into useful utilization data relevant to billing and charging purposes. In an example, the utilization data processing server 305 generates utilization measurements and analysis based on a common unit of measurement for billing and charging for services. This unit of measurement may be transparent to the particular billing algorithm (and related business model) that is being considered or used for evaluation.

As shown in FIG. 3, output measures from the telemetry utilization system, such as provided via the utilization data processing server 305, may include the following data: MEC hardware resource utilization 320 (e.g., encrypted vs. non-encrypted storage); API utilization 310 by the client (e.g., number of API calls per unit time); cloud resource utilization 315; and like utilization information. Input measures to the telemetry utilization system, in addition to the telemetry data from usage of various MEC hosts and UEs, may include a data processing filter 325 based on a UE subscription, and Quality of Service (QoS) levels and premium users. Such measures may be evaluated based on any number of chargeable events tracked in the MEC system (including those defined according to specification), such as using a chargeable events model 330 as a basis to evaluate and determine chargeable data and resource usage.

In an example, various types of outputs may be provided to different tenants (e.g., tenants of different RANs) based on the filter. In order to enable multiple business models, the telemetry utilization system may enable the usage of information from different stakeholders. For instance, in roaming scenarios, a city A and City B may have access to the same data, however, apply different charging policies (the definition of the unit price is out of the scope of the present disclosure). Also, another example is the presence of a public facility or government, having access to few shared resources for free (especially related to public safety/disaster-related scenarios etc.).

As shown in FIG. 3, a UE may be an edge connected device, such as mobile device 340 or vehicle 335. When the UE, such as vehicle 335 is in a first access network, such as the access network 355 provided by Operator 1, the UE may connect to MEC Host 1 345. The UE may make a request, such as with a specific application, for CPU resources. The MEC Host 1 345 may determine a tenant for performing the CPU resource request. The determination of the tenant may be based on the application, such as a tenant dedicated to the requesting application. The tenant determination may be based on available resources or resources available to the UE based on a subscription to services. The MEC Host 1 345 may record and store (locally or remotely) telemetry data related to the resource request, including the tenant identification, the UE identification, characteristics of the request, and characteristics of the UE. Upon completion of the resource request, the resources utilized for completing the request may be stored, including data such as the number of CPU cycles used, the amount of time to complete the request, specific set of CPU resources used, heat generated, and power consumed.

Upon receiving the request, the MEC Host 1 345 may provide the UE with a cost estimation for completing the request. The MEC Host 1 345 may contact the utilization data processing server 305 for the cost estimation. Based on the request, the identified tenant to perform the request, the UE, and the type of utilization, the cost estimate may be determined. The MEC Host 1 345 may communicate the cost estimate to the UE, upon which the UE may accept or reject the cost estimation. If the UE accepts the cost estimation, then the request is completed.

The UE may migrate from one access network to another, such as vehicle 335 moving from access network 355 of Operator 1 to access network 360 of Operator 2. The migration may result with MEC Host 2 350 handling requests from the UE. When the UE is within access network 360 requests and allocation of resources may be performed similarly to when the UE was within access network 355. However, if the UE is not a subscriber of Operator 2 (e.g.: roaming), the allocation of resources and associated billing may differ. The MEC Host 2 350 may communicate with the utilization data processing server 305 to determine the UE is roaming and does not have a subscription associated with Operator 2. The utilization data processing server 305 may communicate the cost or cost estimate for the roaming UE based on the subscription status, the relationship with Operator 1, and the resource request. The MEC Host 2 350 may determine a tenant for performing the CPU resource request. The determination of the tenant may be based on the application, such as a tenant dedicated to the requesting application. The tenant determination may be based on available resources or resources available to the UE based on a subscription to services. For example, the tenant may be selected based on the subscription as MEC Host 2 350 may have a primary set of tenants reserved for Operator 2 subscribers with a secondary set of tenants for non-subscribers. The MEC Host 2 350 may record the identification of the tenant selected for completing the request with identifiers and characteristics of the UE. Additionally, the resources utilized may be recorded upon completion of the request.

The telemetry utilization system may also provide various aspects of negotiability. Such negotiability may enable a UE to obtain a quotation or a cost estimation for a particular service request, including in scenarios where roaming is involved. The systems and techniques discussed herein (e.g., telemetry-based charging and list of chargeable events as functional base for billing) may store historical data in a data format that will allow an MEC host or server to perform fine-grained lookup operations. For example, the MEC host may store a particular MEC application's past telemetry and charged events per tenant and across any number of tenants used for a specific request (e.g., as a UE travels it may utilize multiple tenants). An MEC host may estimate cost of service when given the service attributes such a service name, device identification time it will live on the MEC host, and point of time at which it is to be run, the accompanied computational power needed (e.g. storage, memory, CPU power), and any other resources that may be required to complete the request. The MEC host (in the orchestration layer) may be deployed with an AI-based learning and inferencing scheme that enables scanning the telemetry and billing of MEC applications with various parameters and inferencing the cost projections.

The functionalities of the MEC host may provide for a UE to send a request through the Mx2 interface for cost projection of a particular service request. For instance, if the UE wants to run a gaming MEC application it may query the MEC host for a cost estimation by supplying attributes of the gaming MEC application and the UE. Using the cost estimation the UE may decide whether or not to start the service at the MEC host (or, for example, use the cloud resources instead of the edge resources, especially if the latency requirements are not very stringent).

In further examples, billing may be prorated by taking the fraction of utilizations reported by telemetry, where the fraction is determined on the basis of percent of successful requests. A successful request may be according to whether a request was completed within service level agreements (SLAs) available to the requestor. This may provide for end-to-end consideration in billing and charging. For example, the charge is not for simply the time used, but that portion of the time when the service quality was acceptable Billing may be further prorated by group consumption. For example, a family downloading and consuming the same content or similar content on different devices. Prorating for group consumption may be advantageous when group consumption leads to efficiencies in processing and delivery. For example, if multiple gainers get common scenes rendered in an efficient way at a video server.

In peer-to-peer pushbacks where the edge mobile edge host may be able to send a proxy down to the UE. In this scenario, the proxy performs some computation at the UE instead of doing all in mobile edge host, thus the billing may adjust for the fact that some of the resources were consumed at the UE itself, or a specific UE was used to collaboratively provide services to other UEs.

Chargeable events also may be identified as being relevant to one of the "carriers in the chain". For example, such events may be relevant to video streaming entertainment use cases. The collection of services cooperating to deliver a desired user experience or to fulfill an SLA may communicate with each other in a coordinated sequence, or abstractly may be considered a chain. For example, from FIG. 1B, a cooperation may be a set of interactions between UE 152, RAN of eNB 148, MEC Host 102, serving gateway 158, PDN gateway 156, network 112, POW 160, SOW 162, MEC host 104, RAN of eNB 150, and UE 154. The coordination that roughly traverses this path is a chain. Operator1 may do billing as does Operator 2. A handoff is coordinated in order for the user to get a consistent view of billing.

The computational processing proximity may be a factor to shape a charging scheme. For example, in a task offloading scenario, relatively close computational proximity may be translated into a low end-to-end latency experienced by the UE, even when reduced MEC resources (e.g., VMs) are allocated to that specific UE. In turn, the UE is then not a resource bottleneck for the specific MEC Host (i.e., higher UE loads may be supported by the deployed MEC hosts in the vicinity of the focused UE). As a result, the device owner may receive the MEC service at a lower price, in comparison to a UE, running an application, where the QoS requirements, together with the location may stress out the MEC system. Taking this point further, assuming a distance and QoS-dependent billing scheme, the various MEC system stakeholders may be better motivated to invest in denser system deployments, as MEC deployment density is translated into closer proximity for given QoS demands taken into account in a signed SLA.

The presently disclosed telemetry utilization system may implement these and other forms of features for data processing and the production of relevant billing and charging outputs. It will be understood that other types of data collection, processing, and output variations may also be provided.

Figure 4:
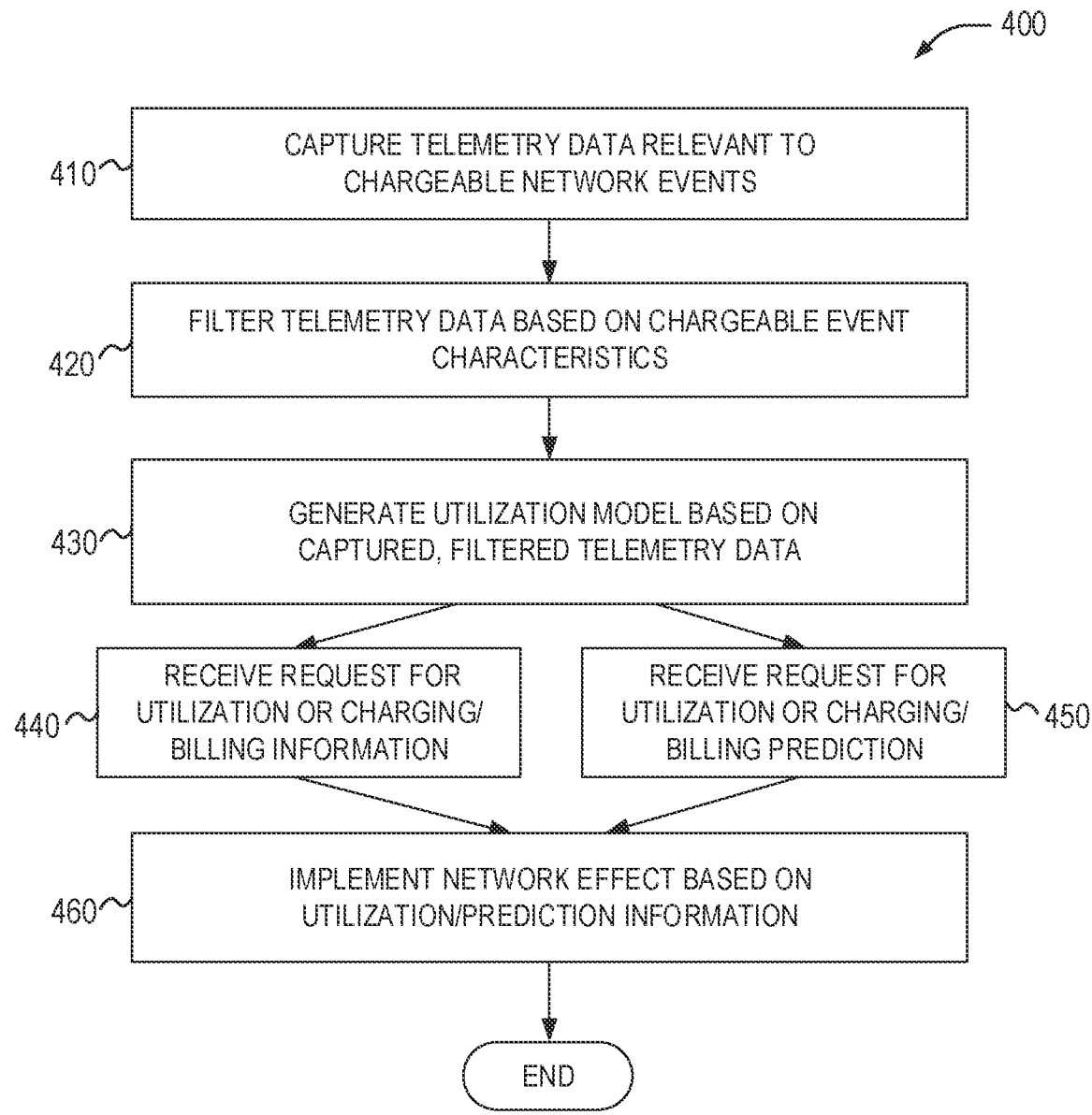
FIG. 4 depicts a flowchart of an example process for processing and analyzing network utilization information, including telemetry data, for use in a MEC system deployment, according to an example.

FIG. 4 depicts a flowchart 400 of an example process for processing and analyzing network utilization information, including telemetry data, for use in a MEC system deployment, according to an example. The following process is depicted from the perspective of a computing system (e.g., the telemetry utilization system) operated by an entity (e.g., network provider) to perform data analysis operations. However, the following operations may be performed by other entities or systems.

The flowchart 400 begins at 410 with operations that capture telemetry data relevant to chargeable network events. This telemetry data may be produced from any number of MEC system operations relating to hardware, software, communication, or functional features. The flowchart 400 then continues with operations that filter the telemetry data, based on chargeable event characteristics.

The flowchart 400 continues with operations at 430 to generate a utilization model based on the captured and filtered telemetry data. Further performed operations are based on the use of this model. In an example, depicted at 440 where a request for utilization information (e.g., historical usage) of a MEC system is received, the model and telemetry data are used to produce chargeable event information, such as for billing and charging purposes. The resultant network effect, which is implemented at 460 based on the utilization information, may include various billing and charging functions.

In another example, depicted at 450 where a request for utilization or charging information (e.g., predicted usage) of the MEC system is received, the model and telemetry data is used to produce a prediction, such as for determining whether additional resources are needed. The resultant network effect, which is implemented at 460 based on the utilization information, may include the allocation of hardware resources, data outputs which indicate the predicted state of the system, or the like.

Figure 5:
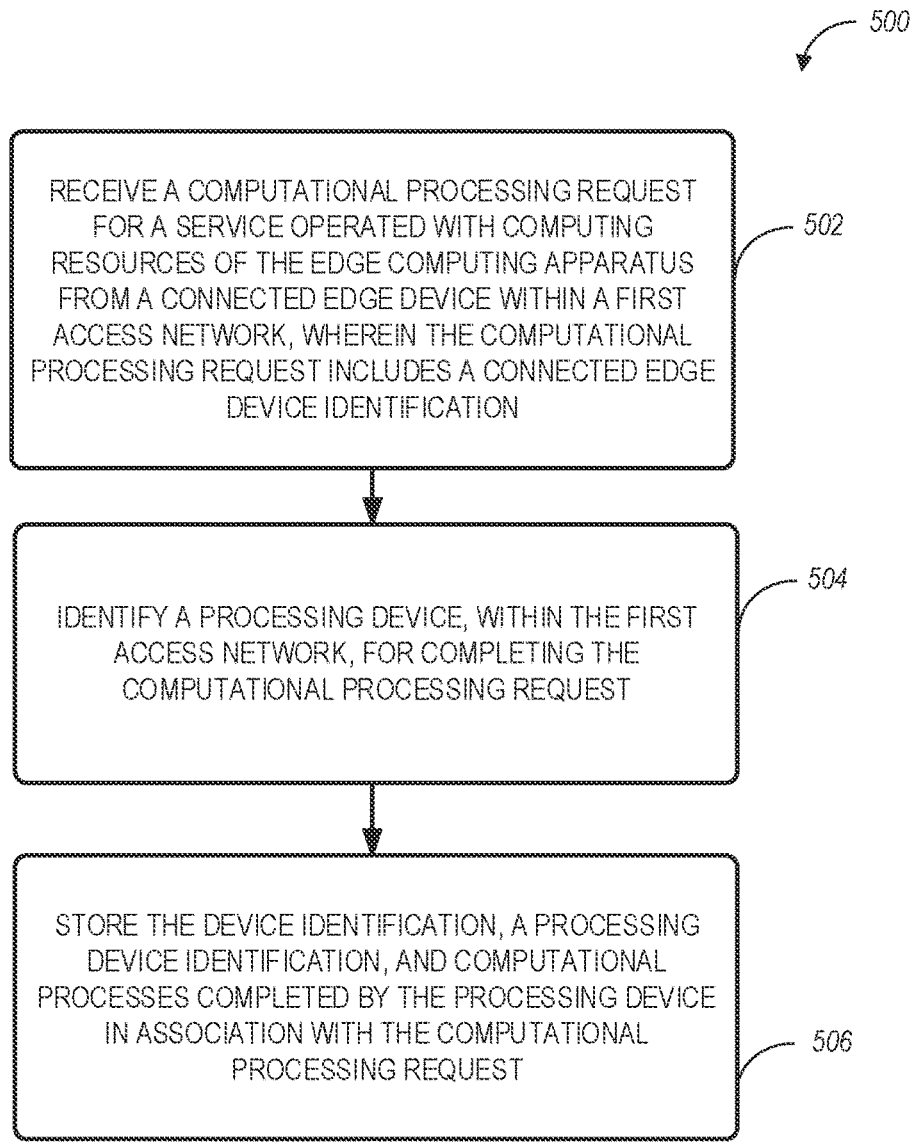
FIG. 5 illustrates a flowchart of a method of implementing MEC utilization tracking for billing and charging.

FIG. 5 illustrates a flowchart 500 of a method of implementing MEC utilization tracking for billing and charging. It will be understood that the following operations are depicted from the perspective of an individual computing system involved in the execution or coordination of resources and services, such as embodied by respective edge computing nodes and network equipment as discussed with the examples above; however, corresponding operations may be performed by endpoint communication devices, intermediate devices, or other entities and services in an implementing system. By way of example and not limitation, the method 500 is described as being performed by MEC host 1 345 or MEC host 2 350.

At operation 502, a device, such as an edge computing apparatus may receive a computational processing request for a service operated with computing resources of the edge computing apparatus from a connected edge device within a first access network, wherein the computational processing request includes a connected edge device identification. For example, UE 335 may be a connected edge device within the first access network, such as access network 355. UE 335 may request a service from MEC host 1 335. UE 335 may provide an identification.

At operation 504, the edge computing apparatus may identify a processing device, within the first access network, for completing the computational processing request. For example, MEC host 1 345 may identify a tenant within access network 355 for completing the request by UE 335. At operation 506, the edge computing apparatus may store the device identification, a processing device identification, and computational processes completed by the processing device in association with the computational processing request. For example, MEC host 1 345 may store the identification of UE 335, the tenant selected for completing the service request of UE 335, and the computational processes performed by the tenant to fulfill the service request. The recorded computational processes may include CPU cycles, bytes stored, bytes transmitted, services accessed, account maintenance fees, roaming charges associated with migrated application contexts, resources utilized for pre-allocation or pre-configuration to improve user experience for mobile devices, QoS charges, quality of security charges, and any processes that may be negotiated through an SLA.

Figure 6:
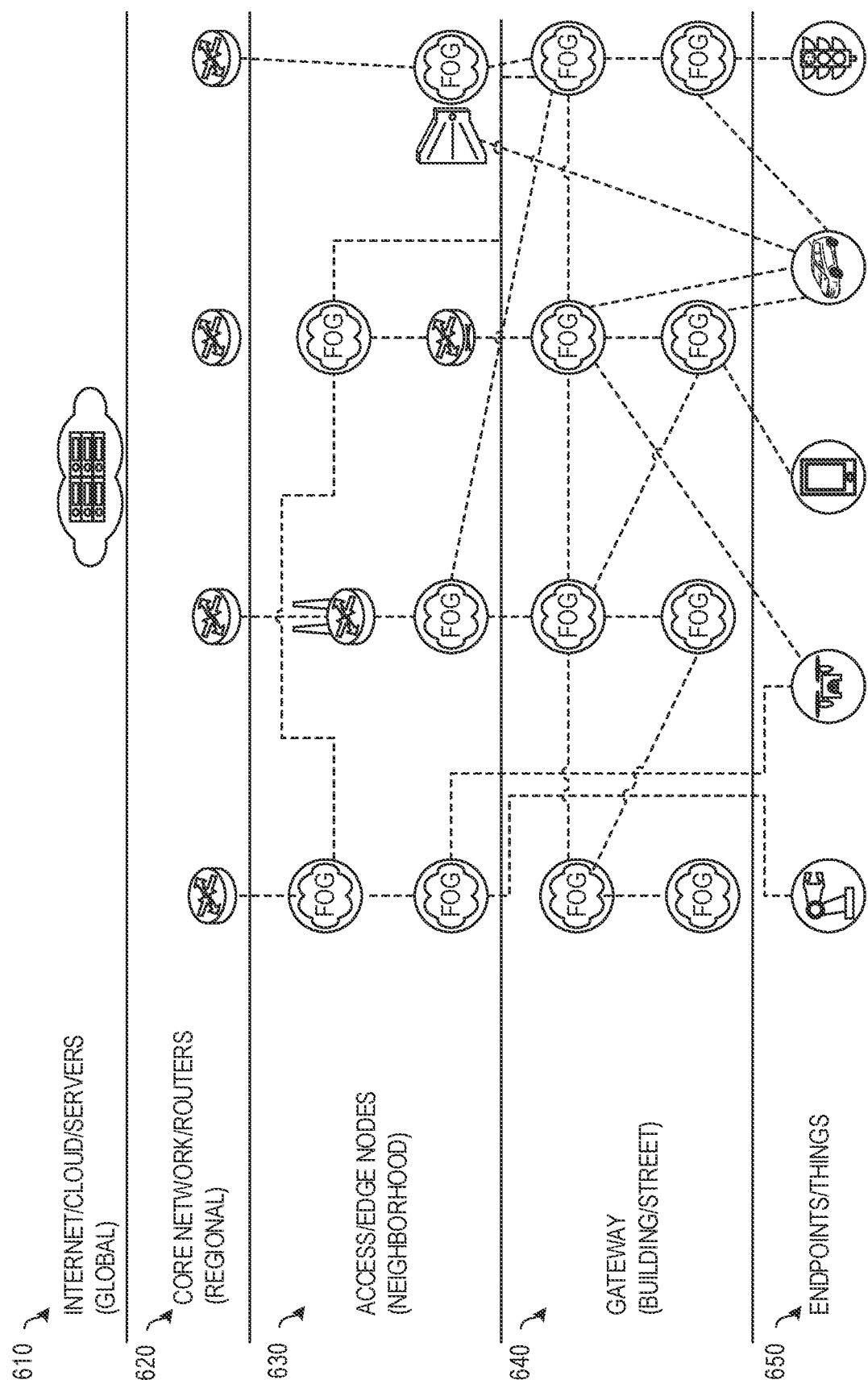
FIG. 6 illustrates a MEC and FOG network topology, according to an example.

FIG. 6 illustrates a MEC and FOG network topology, according to an example. This network topology, which includes a number of conventional networking layers, may be extended through use of the tags and objects discussed herein. Specifically, the relationships between endpoints (at endpoints/things network layer 650), gateways (at gateway layer 640), access or edge computing nodes (e.g., at neighborhood nodes layer 630), core network or routers (e.g., at regional or central office layer 620), may be represented through the use of linked objects and tag properties.

A FOG network (e.g., established at gateway layer 640) may represent a dense geographical distribution of near-user edge devices (e.g., FOG nodes), equipped with storage capabilities (e.g., to avoid the need to store data in cloud data centers), communication capabilities (e.g., rather than routed over the internet backbone), control capabilities, configuration capabilities, measurement and management capabilities (rather than controlled primarily by network gateways such as those in the LTE core network), among others. In this context, FIG. 6 illustrates a general architecture that integrates a number of MEC and FOG nodes-categorized in different layers (based on their position, connectivity and processing capabilities, etc.). It will be understood, however, that such FOG nodes may be replaced or augmented by edge computing processing nodes.

FOG nodes may be categorized depending on the topology and the layer where they are located. In contrast, from a MEC standard perspective, each FOG node may be considered as a mobile edge (ME) Host, or a simple entity hosting a ME app and a light-weighted ME Platform. In an example, a MEC or FOG node may be defined as an application instance, connected to or running on a device (ME Host) that is hosting a ME Platform. Here, the application consumes MEC services and is associated to a ME Host in the system. The nodes may be migrated, associated to different ME Hosts, or consume MEC services from other (e.g., local or remote) ME platforms.

In contrast to this approach, traditional V2V applications are reliant on remote cloud data storage and processing to exchange and coordinate information. A cloud data arrangement allows for long-term data collection and storage, but is not optimal for highly time varying data, such as a collision, traffic light change, etc. and may fail in attempting to meet latency challenges, such as stopping a vehicle when a child runs into the street. The data message translation techniques discussed herein enable direct communication to occur among devices (e.g., vehicles) in a low-latency manner, using features in existing MEC services that provide minimal overhead.

Depending on the real-time requirements in a vehicular communications context, a hierarchical structure of data processing and storage nodes are defined. For example, including local ultra-low-latency processing, regional storage and processing as well as remote cloud data-center based storage and processing. SLAs (service level agreements) and KPIs (key performance indicators) may be used to identify where data is best transferred and where it is processed or stored. This typically depends on the Open Systems Interconnection (OSI) layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center.

Figure 7:
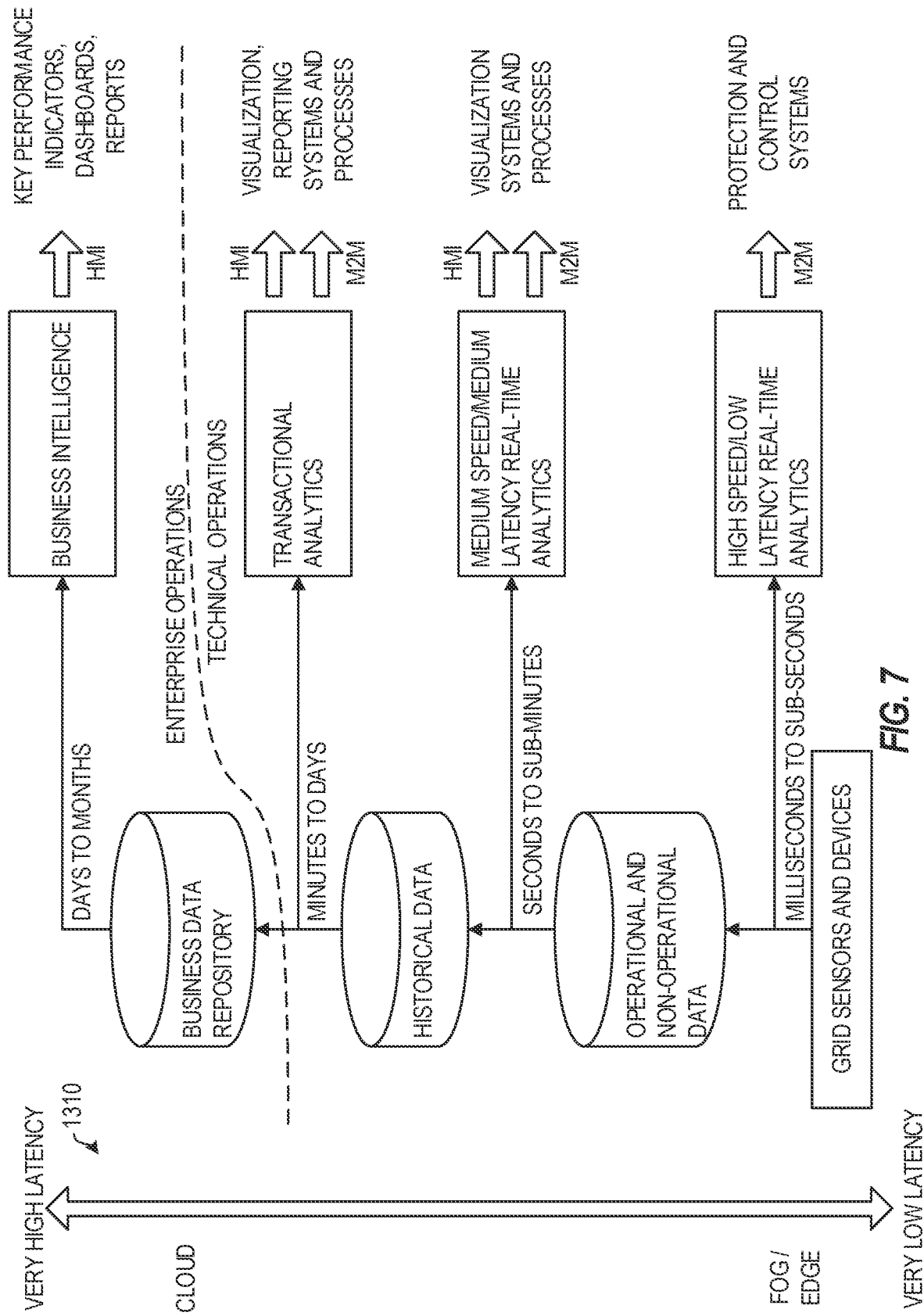
FIG. 7 illustrates processing and storage layers in a MEC and FOG network, according to an example.

FIG. 7 illustrates processing and storage layers in a MEC and FOG network, according to an example. The illustrated data storage or processing hierarchy 710 relative to the cloud and fog/edge networks allows dynamic reconfiguration of elements to meet latency and data processing parameters.

The lowest hierarchy level is on a vehicle-level. This level stores data on past observations or data obtained from other vehicles. The second hierarchy level is distributed storage across a number of vehicles. This distributed storage may change on short notice depending on vehicle proximity to each other or a target location (e.g., near an accident). The third hierarchy level is in a local anchor point, such as a MEC component, carried by a vehicle in order to coordinate vehicles in a pool of cars. The fourth level of hierarchy is storage shared across MEC components. For example, data is shared between distinct pools of vehicles that are in range of each other.

The fifth level of hierarchy is fixed infrastructure storage, such as in RSUs. This level may aggregate data from entities in hierarchy levels 1-4. The sixth level of hierarchy is storage across fixed infrastructure. This level may, for example, be located in the Core Network of a telecommunications network, or an enterprise cloud. Other types of layers and layer processing may follow from this example.

Figure 8:
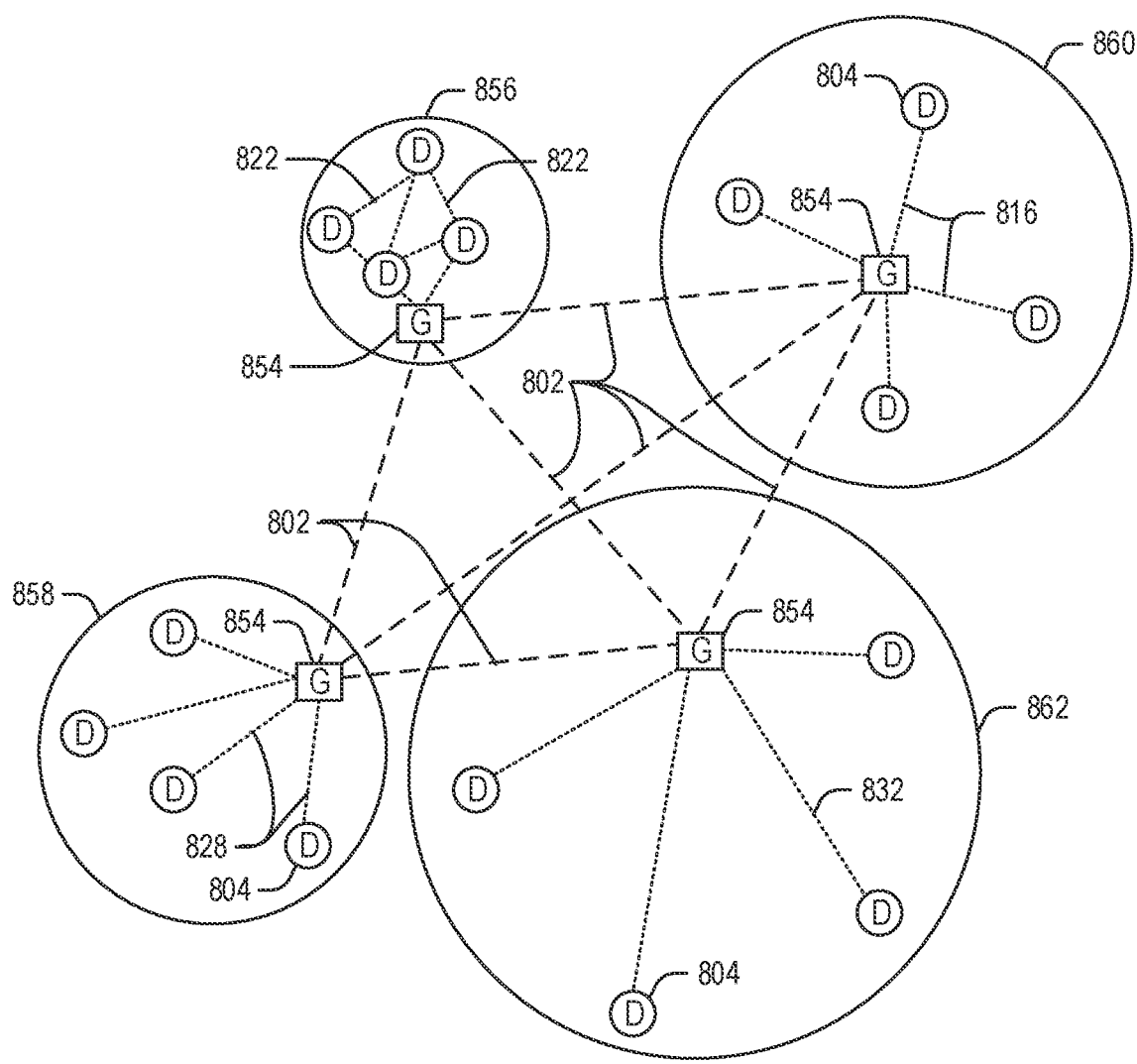
FIG. 8 illustrates an example domain topology for respective IoT networks coupled through links to respective gateways.

FIG. 8 illustrates an example domain topology for respective IoT networks coupled through links to respective gateways. The IoT is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, present a number of new challenges in a heterogeneous network of connectivity comprising a combination of wired and wireless technologies.

FIG. 8 specifically provides a simplified drawing of a domain topology that may be used for a number of internet-of-things (IoT) networks comprising IoT devices 804, with the IoT networks 856, 858, 860, 862, coupled through backbone links 802 to respective gateways 854. For example, a number of IoT devices 804 may communicate with a gateway 854, and with each other through the gateway 854. To simplify the drawing, not every IoT device 804, or communications link (e.g., link 816, 822, 828, or 832) is labeled. The backbone links 802 may include any number of wired or wireless technologies, including optical networks, and may be part of a local area network (LAN), a wide area network (WAN), or the Internet. Additionally, such communication links facilitate optical signal paths among both IoT devices 804 and gateways 854, including the use of MUXing/deMUXing components that facilitate interconnection of the various devices.

The network topology may include any number of types of IoT networks, such as a mesh network provided with the network 856 using Bluetooth low energy (BLE) links 822. Other types of IoT networks that may be present include a wireless local area network (WLAN) network 858 used to communicate with IoT devices 804 through IEEE 802.11 (Wi-Fi®) links 828, a cellular network 860 used to communicate with IoT devices 804 through an LTE/LTE-A (4G) or 5G cellular network, and a low-power wide area (LPWA) network 862, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 804, such as over the backbone links 802, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 856, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 858, for instance, may use systems that perform standards conversion to provide multi-standard connectivity, enabling IoT devices 804 using different protocols to communicate. Further systems may provide seamless interconnectivity across a multi-standard infrastructure comprising visible Internet resources and hidden Internet resources.

Communications in the cellular network 860, for instance, may be enhanced by systems that offload data, extend communications to more remote devices, or both. The LPWA network 862 may include systems that perform non-Internet protocol (IP) to IP interconnections, addressing, and routing. Further, each of the IoT devices 804 may include the appropriate transceiver for wide area communications with that device. Further, each IoT device 804 may include other transceivers for communications using additional protocols and frequencies. This is discussed further with respect to the communication environment and hardware of an IoT processing device depicted in FIGS. 10 and 11.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 9 below.

Figure 9:
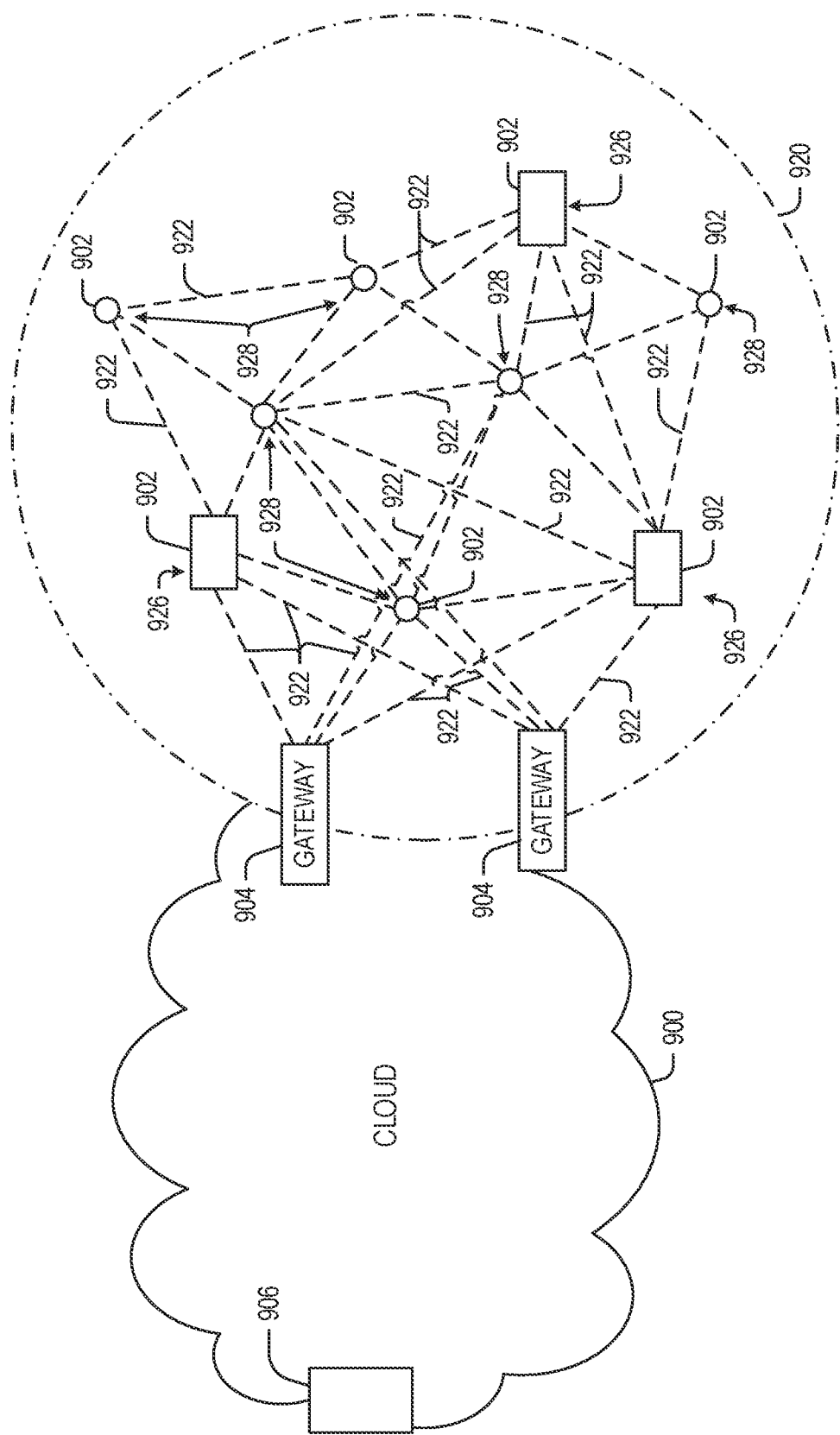
FIG. 9 illustrates a cloud computing network in communication with a mesh network of IoT devices operating as a fog device at the edge of the cloud computing network.

FIG. 9 illustrates a cloud computing network in communication with a mesh network of IoT devices (devices 902) operating as a fog device at the edge of the cloud computing network. The mesh network of IoT devices may be termed a fog 920, operating at the edge of the cloud 900. To simplify the diagram, not every IoT device 902 is labeled.

The fog 920 may be considered to be a massively interconnected network wherein a number of IoT devices 902 are in communications with each other, for example, by radio links 922. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 902 are shown in this example, gateways 904, data aggregators 926, and sensors 928, although any combinations of IoT devices 902 and functionality may be used. The gateways 904 may be edge devices that provide communications between the cloud 900 and the fog 920, and may also provide the backend process function for data obtained from sensors 928, such as motion data, flow data, temperature data, and the like. The data aggregators 926 may collect data from any number of the sensors 928, and perform the back end processing function for the analysis. The results, raw data, or both may be passed along to the cloud 900 through the gateways 904. The sensors 928 may be full IoT devices 902, for example, capable of both collecting data and processing the data. In some cases, the sensors 928 may be more limited in functionality, for example, collecting the data and allowing the data aggregators 926 or gateways 904 to process the data.

Communications from any IoT device 902 may be passed along a convenient path (e.g., a most convenient path) between any of the IoT devices 902 to reach the gateways 904. In these networks, the number of interconnections provide substantial redundancy, allowing communications to be maintained, even with the loss of a number of IoT devices 902. Further, the use of a mesh network may allow IoT devices 902 that are very low power or located at a distance from infrastructure to be used, as the range to connect to another IoT device 902 may be much less than the range to connect to the gateways 904.

The fog 920 provided from these IoT devices 902 may be presented to devices in the cloud 900, such as a server 906, as a single device located at the edge of the cloud 900, e.g., a fog device. In this example, the alerts coming from the fog device may be sent without being identified as coming from a specific IoT device 902 within the fog 920. In this fashion, the fog 920 may be considered a distributed platform that provides computing and storage resources to perform processing or data-intensive tasks such as data analytics, data aggregation, and machine-learning, among others.

In some examples, the IoT devices 902 may be configured using an imperative programming style, e.g., with each IoT device 902 having a specific function and communication partners. However, the IoT devices 902 forming the fog device may be configured in a declarative programming style, allowing the IoT devices 902 to reconfigure their operations and communications, such as to determine needed resources in response to conditions, queries, and device failures. As an example, a query from a user located at a server 906 about the operations of a subset of equipment monitored by the IoT devices 902 may result in the fog 920 device selecting the IoT devices 902, such as particular sensors 928, needed to answer the query. The data from these sensors 928 may then be aggregated and analyzed by any combination of the sensors 928, data aggregators 926, or gateways 904, before being sent on by the fog 920 device to the server 906 to answer the query. In this example, IoT devices 902 in the fog 920 may select the sensors 928 used based on the query, such as adding data from flow sensors or temperature sensors. Further, if some of the IoT devices 902 are not operational, other IoT devices 902 in the fog 920 device may provide analogous data, if available.

Figure 10:
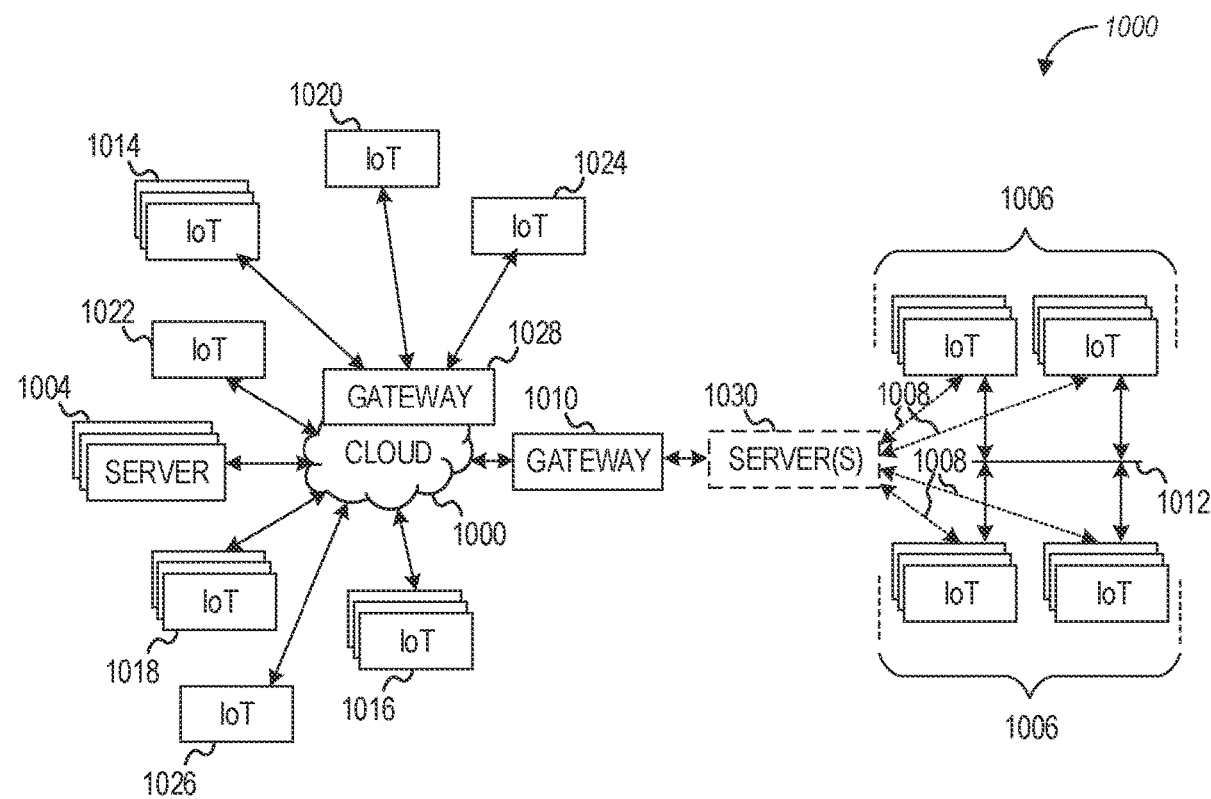
FIG. 10 illustrates a drawing of a cloud computing network, or cloud, in communication with a number of Internet of Things (IoT) devices.

FIG. 10 illustrates a drawing of a cloud computing network, or cloud 1000, in communication with a number of Internet of Things (IoT) devices. The cloud 1000 may represent the Internet, or may be a local area network (LAN), or a wide area network (WAN), such as a proprietary network for a company. The IoT devices may include any number of different types of devices, grouped in various combinations. For example, a traffic control group 1006 may include IoT devices along streets in a city. These IoT devices may include stoplights, traffic flow monitors, cameras, weather sensors, and the like. The traffic control group 1006, or other subgroups, may be in communication with the cloud 1000 through wired or wireless links 1008, such as LPWA links, optical links, and the like. Further, a wired or wireless sub-network 1012 may allow the IoT devices to communicate with each other, such as through a local area network, a wireless local area network, and the like. The IoT devices may use another device, such as a gateway 1010 or 1028 to communicate with remote locations such as the cloud 1000; the IoT devices may also use one or more servers 1030 to facilitate communication with the cloud 1000 or with the gateway 1010. For example, the one or more servers 1030 may operate as an intermediate network node to support a local edge cloud or fog implementation among a local area network. Further, the gateway 1028 that is depicted may operate in a cloud-to-gateway-to-many edge devices configuration, such as with the various IoT devices 1014, 1020, 1024 being constrained or dynamic to an assignment and use of resources in the cloud 1000.

Other example groups of IoT devices may include remote weather stations 1014, local information terminals 1016, alarm systems 1018, automated teller machines 1020, alarm panels 1022, or moving vehicles, such as emergency vehicles 1024 or other vehicles 1026, among many others. Each of these IoT devices may be in communication with other IoT devices, with servers 1004, with another IoT fog device or system, or a combination therein. The groups of IoT devices may be deployed in various residential, commercial, and industrial settings (including in both private or public environments).

As may be seen from FIG. 10, a large number of IoT devices may be communicating through the cloud 1000. This may allow different IoT devices to request or provide information to other devices autonomously. For example, a group of IoT devices (e.g., the traffic control group 1006) may request a current weather forecast from a group of remote weather stations 1014, which may provide the forecast without human intervention. Further, an emergency vehicle 1024 may be alerted by an automated teller machine 1020 that a burglary is in progress. As the emergency vehicle 1024 proceeds towards the automated teller machine 1020, it may access the traffic control group 1006 to request clearance to the location, for example, by lights turning red to block cross traffic at an intersection in sufficient time for the emergency vehicle 1024 to have unimpeded access to the intersection.

Clusters of IoT devices, such as the remote weather stations 1014 or the traffic control group 1006, may be equipped to communicate with other IoT devices as well as with the cloud 1000. This may allow the IoT devices to form an ad-hoc network between the devices, allowing them to function as a single device, which may be termed a fog device or system (e.g., as described above).

Figure 11:
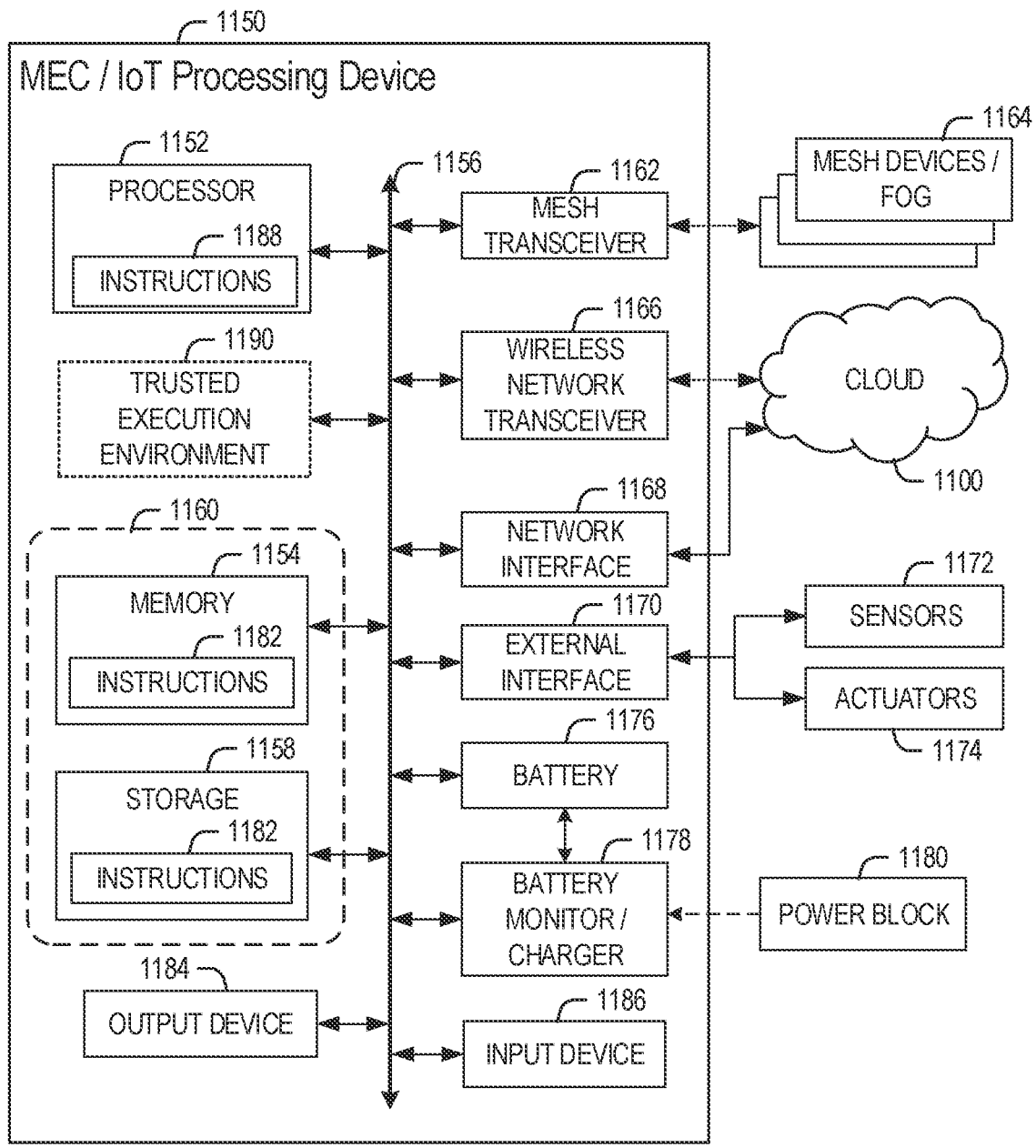
FIG. 11 is a block diagram of an example of components that may be present in an IoT device for implementing the techniques described herein.

FIG. 11 is a block diagram of an example of components that may be present in an IoT device 1150 for implementing the techniques described herein. The IoT device 1150 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1150, or as components otherwise incorporated within a chassis of a larger system. Additionally, the block diagram of FIG. X4 is intended to depict a high-level view of components of the IoT device 1150. However, some of the components shown may be omitted, additional components may be present, and different arrangement of the components shown may occur in other implementations.

The IoT device 1150 may include a processor 1152, which may be a microprocessor, a multi-core processor, a multi-threaded processor, an ultra-low voltage processor, an embedded processor, or other known processing element. The processor 1152 may be a part of a system on a chip (SoC) in which the processor 1152 and other components are formed into a single integrated circuit, or a single package, such as the Edison™ or Galileo™ SoC boards from Intel. As an example, the processor 1152 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A12 processor from Apple® Inc., a Snapdragon™ processor from Qualcomm® Technologies, Inc., or an OMAP™ processor from Texas Instruments, Inc.

The processor 1152 may communicate with a system memory 1154 over an interconnect 1156 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1158 may also couple to the processor 1152 via the interconnect 1156. In an example, the storage 1158 may be implemented via a solid state disk drive (SSDD). Other devices that may be used for the storage 1158 include flash memory cards, such as SD cards, microSD cards, xD picture cards, and the like, and USB flash drives. In low power implementations, the storage 1158 may be on-die memory or registers associated with the processor 1152. However, in some examples, the storage 1158 may be implemented using a micro hard disk drive (HDD). Further, any number of new technologies may be used for the storage 1158 in addition to, or instead of, the technologies described, such resistance change memories, phase change memories, holographic memories, or chemical memories, among others.

The components may communicate over the interconnect 1156. The interconnect 1156 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1156 may be a proprietary bus, for example, used in a SoC based system. Other bus systems may be included, such as an 12C interface, an SPI interface, point to point interfaces, and a power bus, among others.

The interconnect 1156 may couple the processor 1152 to a mesh transceiver 1162, for communications with other mesh devices 1164. The mesh transceiver 1162 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1164. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1162 may communicate using multiple standards or radios for communications at different range. For example, the IoT device 1150 may communicate with close devices, e.g., within about 2 meters, using a local transceiver based on BLE, or another low power radio, to save power. More distant mesh devices 1164, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1166 may be included to communicate with devices or services in the cloud 1100 via local or wide area network protocols. The wireless network transceiver 1166 may be a LPWA transceiver that follows the IEEE 802.15.4, or IEEE 802.15.4g standards, among others. The IoT device 1150 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1162 and wireless network transceiver 1166, as described herein. For example, the radio transceivers 1162 and 1166 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1162 and 1166 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1166, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1168 may be included to provide a wired communication to the cloud 1100 or to other devices, such as the mesh devices 1164. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1168 may be included to allow connect to a second network, for example, a NIC 1168 providing communications to the cloud over Ethernet, and a second NIC 1168 providing communications to other devices over another type of network.

The interconnect 1156 may couple the processor 1152 to an external interface 1170 that is used to connect external devices or subsystems. The external devices may include sensors 1172, such as accelerometers, level sensors, flow sensors, optical light sensors, camera sensors, temperature sensors, a global positioning system (GPS) sensors, pressure sensors, barometric pressure sensors, and the like. The external interface 1170 further may be used to connect the IoT device 1150 to actuators 1174, such as power switches, valve actuators, an audible sound generator, a visual warning device, and the like.

In some optional examples, various input/output (I/O) devices may be present within, or connected to, the IoT device 1150. For example, a display or other output device 1184 may be included to show information, such as sensor readings or actuator position. An input device 1186, such as a touch screen or keypad may be included to accept input. An output device 1184 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1150.

A battery 1176 may power the IoT device 1150, although in examples in which the IoT device 1150 is mounted in a fixed location, it may have a power supply coupled to an electrical grid. The battery 1176 may be a lithium ion battery, or a metal-air battery, such as a zinc-air battery, an aluminum-air battery, a lithium-air battery, and the like.

A battery monitor/charger 1178 may be included in the IoT device 1150 to track the state of charge (SoCh) of the battery 1176. The battery monitor/charger 1178 may be used to monitor other parameters of the battery 1176 to provide failure predictions, such as the state of health (SoH) and the state of function (SoF) of the battery 1176. The battery monitor/charger 1178 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1178 may communicate the information on the battery 1176 to the processor 1152 over the interconnect 1156. The battery monitor/charger 1178 may also include an analog-to-digital (ADC) convertor that allows the processor 1152 to directly monitor the voltage of the battery 1176 or the current flow from the battery 1176. The battery parameters may be used to determine actions that the IoT device 1150 may perform, such as transmission frequency, mesh network operation, sensing frequency, and the like.

A power block 1180, or other power supply coupled to a grid, may be coupled with the battery monitor/charger 1178 to charge the battery 1176. In some examples, the power block 1180 may be replaced with a wireless power receiver to obtain the power wirelessly, for example, through a loop antenna in the IoT device 1150. A wireless battery charging circuit, such as an LTC4020 chip from Linear Technologies of Milpitas, Calif., among others, may be included in the battery monitor/charger 1178. The specific charging circuits chosen depend on the size of the battery 1176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1158 may include instructions 1182 in the form of software, firmware, or hardware commands to implement the techniques described herein. Although such instructions 1182 are shown as code blocks included in the memory 1154 and the storage 1158, it may be understood that any of the code blocks may be replaced with hardwired circuits, for example, built into an application specific integrated circuit (ASIC).

In an example, the instructions 1182 provided via the memory 1154, the storage 1158, or the processor 1152 may be embodied as a non-transitory, machine readable medium 1160 including code to direct the processor 1152 to perform electronic operations in the IoT device 1150. The processor 1152 may access the non-transitory, machine readable medium 1160 over the interconnect 1156. For instance, the non-transitory, machine readable medium 1160 may be embodied by devices described for the storage 1158 of FIG. 11 or may include specific storage units such as optical disks, flash drives, or any number of other hardware devices. The non-transitory, machine readable medium 1160 may further include, provide, or invoke instructions 1188 to direct the processor 1152 to perform a specific sequence or flow of actions, for example, as described with respect to the flowchart(s) and block diagram(s) of operations and functionality depicted above.

In an example, the instructions 1188 on the processor 1152 (separately, or in combination with the instructions 1188 of the machine readable medium 1160) may configure execution or operation of a trusted execution environment (TEE) 1190. In an example, the TEE 1190 operates as a protected area accessible to the processor 152 to enable secure access to data and secure execution of instructions. Various implementations of the TEE 1190, and an accompanying secure area in the processor 1152 or the memory 1154 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1150 through the TEE 1190 and the processor 1152.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine readable medium may be provided by a storage device or other apparatus which is capable of hosting data in a non-transitory format. In an example, information stored or otherwise provided on a machine readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

In various examples, the operations and functionality described herein may be embodied by a machine, or set of machines in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the examples above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Other variations to the preceding procedures and interfaces will be apparent from the examples above.

Implementation of the preceding techniques may be accomplished through any number of specifications, configurations, or example deployments of hardware and software. It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the non-limiting examples may stand on its own, or may be combined in any permutation or combination with any one or more of the other examples provided below or throughout the present disclosure.

Example 1 is an edge computing apparatus, comprising: communications circuitry to communicate with a first access network; processing circuitry; and a memory device including instructions embodied thereon, wherein the instructions, which when executed by the processing circuitry, configure the processing circuitry to perform operations to: receive a computational processing request for a service operated with computing resources of the edge computing apparatus from a connected edge device within the first access network, wherein the computational processing request includes, an identification of the connected edge device; identify a processing device, within the first access network, for performing the computational processing request; and store the identification of the connected edge device, a processing device identification, and data describing the computational processes completed by the processing device in association with the computational processing request.

In Example 2, the subject matter of Example 1 includes, wherein the edge computing apparatus operates according to a standard from an European Telecommunications Standards Institute (ETSI) Multi-Access Edge Computing (MEC) standards family.

In Example 3, the subject matter of Examples 1-2 includes, the operations further to: determine a billing charge for the connected edge device based on the computational processes completed and the processing device identification.

In Example 4, the subject matter of Example 3 includes, wherein the billing charge is further determined based on the connected edge device having a subscription to services of the first access network.

In Example 5, the subject matter of Examples 3-4 includes, wherein the billing charge is further determined based on the number of central processor unit cycles of the processing device used for the computational processing request.

In Example 6, the subject matter of Examples 3-5 includes, wherein the billing charge is further determined based on a reserved time of the processing device for the computational processing request.

In Example 7, the subject matter of Examples 1-6 includes, the operations further to: transmit a cost estimate to the edge computing device based on the computational processing request, the processing device, and a subscription status of the device in relation to services of the first access network; and receive a confirmation from the edge computing device to perform the computational processing request based on the cost estimate.

In Example 8, the subject matter of Examples 1-7 includes, wherein the processing device is determined in part based on the proximity of the processing device to the edge computing device.

In Example 9, the subject matter of Examples 1-8 includes, the operations further to: determine the device has migrated from the first access network to a second access network; identify a second processing device, within the second access network, for completing the computational processing request; and store the edge computing device identification, a second processing device identification, and data describing the computational processes completed by the second processing device.

In Example 10, the subject matter of Example 9 includes, the operations further to: determine a billing charge for the connected edge device based on a combination of a first calculation using the computational processes completed by the processing device and the processing device identification, and a second calculation using the computational processes completed by the second processing device and the second processing device identification.

In Example 11, the subject matter of Example 10 includes, wherein the billing charge is further determined based on a subscription status for the connected edge device to services of the first access network and services of the second access network.

In Example 12, the subject matter of Examples 1-11 includes, wherein the computational processing request includes characteristics of the connected edge device; and wherein identifying the processing device is based in part on the characteristics of the connected edge device.

Example 13 is a method, performed by an edge computing apparatus, comprising: receiving a computational processing request for a service operated with computing resources of the edge computing apparatus from a connected edge device within the first access network, wherein the computational processing request includes, an identification of the connected edge device; identifying a processing device, within the first access network, for performing the computational processing request; and storing the identification of the connected edge device, a processing device identification, and data describing the computational processes completed by the processing device in association with the computational processing request.

In Example 14, the subject matter of Example 13 includes, wherein the edge computing apparatus operates according to a standard from an European Telecommunications Standards Institute (ETSI) Multi-Access Edge Computing (MEC) standards family.

In Example 15, the subject matter of Examples 13-14 includes, determining a billing charge for the connected edge device based on the computational processes completed and the processing device identification.

In Example 16, the subject matter of Example 15 includes, wherein the billing charge is further determined based on the connected edge device having a subscription to services of the first access network.

In Example 17, the subject matter of Examples 15-16 includes, wherein the billing charge is further determined based on the number of central processor unit cycles of the processing device used for the computational processing request.

In Example 18, the subject matter of Examples 15-17 includes, wherein the billing charge is further determined based on a reserved time of the processing device for the computational processing request.

In Example 19, the subject matter of Examples 13-18 includes, transmitting a cost estimate to the edge computing device based on the computational processing request, the processing device, and a subscription status of the device in relation to services of the first access network; and receiving a confirmation from the edge computing device to perform the computational processing request based on the cost estimate.

In Example 20, the subject matter of Examples 13-19 includes, wherein the processing device is determined in part based on the proximity of the processing device to the edge computing device.

In Example 21, the subject matter of Examples 13-20 includes, determining the device has migrated from the first access network to a second access network; identifying a second processing device, within the second access network, for completing the computational processing request; and storing the edge computing device identification, a second processing device identification, and data describing the computational processes completed by the second processing device.

In Example 22, the subject matter of Example 21 includes, determining a billing charge for the connected edge device based on a combination of a first calculation using the computational processes completed by the processing device and the processing device identification, and a second calculation using the computational processes completed by the second processing device and the second processing device identification.

In Example 23, the subject matter of Example 22 includes, wherein the billing charge is further determined based on a subscription status for the connected edge device to services of the first access network and services of the second access network.

In Example 24, the subject matter of Examples 13-23 includes, wherein the computational processing request includes characteristics of the connected edge device; and wherein identifying the processing device is based in part on the characteristics of the connected edge device.

Example 25 is at least one computer readable medium including instructions, wherein the instructions when executed by a processing circuitry of a computing device, cause the processing circuitry to: receive a computational processing request for a service operated with computing resources of an edge computing apparatus from a connected edge device within the first access network, wherein the computational processing request includes, an identification of the connected edge device; identify a processing device, within the first access network, for performing the computational processing request; and store the identification of the connected edge device, a processing device identification, and data describing the computational processes completed by the processing device in association with the computational processing request.

In Example 26, the subject matter of Example 25 includes, wherein the edge computing apparatus operates according to a standard from an European Telecommunications Standards Institute (ETSI) Multi-Access Edge Computing (MEC) standards family.

In Example 27, the subject matter of Examples 25-26 includes, instructions to: determine a billing charge for the connected edge device based on the computational processes completed and the processing device identification.

In Example 28, the subject matter of Example 27 includes, wherein the billing charge is further determined based on the connected edge device having a subscription to services of the first access network.

In Example 29, the subject matter of Examples 27-28 includes, wherein the billing charge is further determined based on the number of central processor unit cycles of the processing device used for the computational processing request.

In Example 30, the subject matter of Examples 27-29 includes, wherein the billing charge is further determined based on a reserved time of the processing device for the computational processing request.

In Example 31, the subject matter of Examples 25-30 includes, instructions to: transmit a cost estimate to the edge computing device based on the computational processing request, the processing device, and a subscription status of the device in relation to services of the first access network; and receive a confirmation from the edge computing device to perform the computational processing request based on the cost estimate.

In Example 32, the subject matter of Examples 25-31 includes, wherein the processing device is determined in part based on the proximity of the processing device to the edge computing device.

In Example 33, the subject matter of Examples 25-32 includes, instructions to: determine the device has migrated from the first access network to a second access network; identify a second processing device, within the second access network, for completing the computational processing request; and store the edge computing device identification, a second processing device identification, and data describing the computational processes completed by the second processing device.

In Example 34, the subject matter of Example 33 includes, instructions to: determine a billing charge for the connected edge device based on a combination of a first calculation using the computational processes completed by the processing device and the processing device identification, and a second calculation using the computational processes completed by the second processing device and the second processing device identification.

In Example 35, the subject matter of Example 34 includes, wherein the billing charge is further determined based on a subscription status for the connected edge device to services of the first access network and services of the second access network.

In Example 36, the subject matter of Examples 25-35 includes, wherein the computational processing request includes characteristics of the connected edge device; and wherein identifying the processing device is based in part on the characteristics of the connected edge device.

Example 37 is a system comprising: means for receiving a computational processing request for a service operated with computing resources of the edge computing apparatus from a connected edge device within the first access network, wherein the computational processing request includes, an identification of the connected edge device; means for identifying a processing device, within the first access network, for performing the computational processing request; and means for storing the identification of the connected edge device, a processing device identification, and data describing the computational processes completed by the processing device in association with the computational processing request.

In Example 38, the subject matter of Example 37 includes, wherein the edge computing apparatus operates according to a standard from an European Telecommunications Standards Institute (ETSI) Multi-Access Edge Computing (MEC) standards family.

In Example 39, the subject matter of Examples 37-38 includes, means for determining a billing charge for the connected edge device based on the computational processes completed and the processing device identification.

In Example 40, the subject matter of Example 39 includes, wherein the billing charge is further determined based on the connected edge device having a subscription to services of the first access network.

In Example 41, the subject matter of Examples 39-40 includes, wherein the billing charge is further determined based on the number of central processor unit cycles of the processing device used for the computational processing request.

In Example 42, the subject matter of Examples 39-41 includes, wherein the billing charge is further determined based on a reserved time of the processing device for the computational processing request.

In Example 43, the subject matter of Examples 37-42 includes, means for transmitting a cost estimate to the edge computing device based on the computational processing request, the processing device, and a subscription status of the device in relation to services of the first access network; and means for receiving a confirmation from the edge computing device to perform the computational processing request based on the cost estimate.

In Example 44, the subject matter of Examples 37-43 includes, wherein the processing device is determined in part based on the proximity of the processing device to the edge computing device.

In Example 45, the subject matter of Examples 37-44 includes, means for determining the device has migrated from the first access network to a second access network; means for identifying a second processing device, within the second access network, for completing the computational processing request; and means for storing the edge computing device identification, a second processing device identification, and data describing the computational processes completed by the second processing device.

In Example 46, the subject matter of Example 45 includes, means for determining a billing charge for the connected edge device based on a combination of a first calculation using the computational processes completed by the processing device and the processing device identification, and a second calculation using the computational processes completed by the second processing device and the second processing device identification.

In Example 47, the subject matter of Example 46 includes, wherein the billing charge is further determined based on a subscription status for the connected edge device to services of the first access network and services of the second access network.

In Example 48, the subject matter of Examples 37-47 includes, wherein the computational processing request includes characteristics of the connected edge device; and wherein identifying the processing device is based in part on the characteristics of the connected edge device.

Example 49 is at least one machine-readable medium including instructions that, when executed by processing circuitry, cause the processing circuitry to perform operations to implement of any of Examples 1-48.

Example 50 is an apparatus comprising means to implement of any of Examples 1-48.

Example 51 may include one or more non-transitory computer-readable media comprising instructions to cause an electronic device, upon execution of the instructions by one or more processors of the electronic device, to perform one or more elements of a method described in or related to any of examples 1-48, or any other method or process described herein.

Example 52 may include an apparatus comprising logic, modules, or circuitry to perform one or more elements of a method described in or related to any of examples 1-48, or any other method or process described herein.

Example 53 may include a method, technique, or process as described in or related to any of examples 1-48, or portions or parts thereof.

Example 54 may include an apparatus comprising: one or more processors and one or more computer readable media comprising instructions that, when executed by the one or more processors, cause the one or more processors to perform the method, techniques, or process as described in or related to any of examples 1-48, or portions thereof.

Example 55 may include a signal as described in or related to any of examples 1-48, or portions or parts thereof.

Example 57 may include a signal in a wireless network as described in or related to any of examples 1-48, or as otherwise shown and described herein.

Example 58 may include a method of communicating in a wireless network as described in or related to any of examples 1-48, or as otherwise shown and described herein.

Example 59 may include a system for providing wireless communication as described in or related to any of examples 1-48, or as otherwise shown and described herein.

Example 60 may include a device for providing wireless communication as described in or related to any of examples 1-48, or as otherwise shown and described herein.

Example 61 is a network comprising respective devices and device communication mediums for performing any of the operations of examples 1-48, or as otherwise shown and described herein.

Example 62 is an 4G/5G communications network topology, the network topology comprising respective communication links adapted to perform communications for the operations of any of examples 1-48, or as otherwise shown and described herein.

Example 63 is an edge cloud computing device implementation comprising processing nodes and computing units adapted for performing any of the operations of examples 1-48, or as otherwise shown and described herein.

Example 64 is an ETSI MEC system implementation comprising devices, processing nodes, and computing units adapted for performing any of the operations of examples 1-48, or as otherwise shown and described herein.

Example 65 is a MEC system implementation, including respective MEC entities including MEC hosts, MEC platforms, orchestrator, adapted for performing any of the operations of examples 1-48, or as otherwise shown and described herein.

Example 66 is an edge cloud network platform comprising physical and logical computing resources adapted for performing any of the operations of examples 1-48, or as otherwise shown and described herein.

Example 67 is an apparatus comprising respective means for performing any of the operations of examples 1-48, or as otherwise shown and described herein.

Example 68 is a system to perform the operations of any of examples 1-48, or as otherwise shown and described herein.

Example 69 is at least one machine-readable storage medium, comprising information representative of instructions that, when executed by processing circuitry, cause the processing circuitry to, perform the operations of any of examples 1-48.

In the above Detailed Description, various features may be grouped together to streamline the disclosure. However, claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A method of managing data for computational processes performed in an edge computing system, performed by at least one apparatus of the edge computing system, the method comprising:
    identifying a computational processing request for a service offered in the edge computing system, wherein the computational processing request originates from an endpoint device connected to the edge computing system;
    determining an identification of the endpoint device based on the computational processing request;
    determining an identification of a tenant of the edge computing system to provide the service for the computational processing request;
    identifying telemetry from servicing of the computational processing request, wherein the telemetry is produced by the tenant from one or more computational processes executed by the tenant for the service;
    associating the telemetry with the identification of the endpoint device and the identification of the tenant; and
    generating charging information to support billing of respective computational processes completed for the computational processing request, the charging information including at least a portion of the telemetry, the identification of the endpoint device, and the identification of the tenant;
    wherein generating the charging information comprises prorating billing for the service by taking a fraction of utilizations reported by the telemetry, the fraction being determined based on percent of successful requests from the endpoint device completed within service level agreements (SLAs) available to the endpoint device and based on a portion of time used for which service quality of the service was acceptable under one of the SLAs.

2. The method of claim 1, wherein the tenant is provided in a virtual device of a computing system of the edge computing system, wherein usage of the tenant is managed by the edge computing system, and wherein the charging information relates to resources predicted for, allocated for, or used by the computational processes of the tenant.

3. The method of claim 1, further comprising:
    determining a billing charge to be assessed to the endpoint device based on the computational processes operated by the tenant and data provided in the telemetry.

4. The method of claim 3, wherein the billing charge is determined based on at least one of:
    a number of central processor unit cycles of a processing device used by the tenant for the computational processing request,
    a reserved time of a processing device used by the tenant for the computational processing request, or
    a subscription status for the endpoint device to use one or more services of an access network associated with the tenant.

5. The method of claim 1, wherein the telemetry includes one or more of:
    network information relating to bandwidth utilization, collision rate, latency, or jitter;
    hosting environment information relating to resource utilization, CPU, memory, storage, I/O, or power; or
    management service information relating to orchestration, device lifecycle, security, or software update.

6. The method of claim 1, further comprising:
    transmitting a cost estimate to the endpoint device based on the computational processing request and a subscription status of the endpoint device in relation to services of an access network used by the endpoint device;
    receiving a confirmation from the endpoint device to perform the computational processing request based on the cost estimate; and
    forwarding the computational processing request to the tenant, in response to the confirmation to perform the computational processing request.

7. The method of claim 1, wherein determining an identification of the tenant is based on the service and resources available to the endpoint device based on a subscription to services, a primary set of tenants being reserved for subscribers of the edge computing system and a secondary set of tenants being reserved for non-subscribers of the edge computing system.

8. The method of claim 1, wherein generating the charging information comprises prorating billing for the service based on whether group consumption of identical or similar content on different endpoint devices that are associated with each other was used.

9. The method of claim 1, wherein generating charging information comprises adjusting charging for the service based on computational processing proximity to the endpoint device and Quality of Service (QoS) to be used for the service.

10. The method of claim 1, further comprising measuring parameters that include a specific set of computational resources, heat generated, and power consumed by the respective computational processes for the computational processing request, and storing the parameters in response to completion of the computational processing request.

11. The method of claim 1, further comprising filtering the computational processing request based on a subscription of the endpoint device to the edge computing system, and Quality of Service (QoS) levels and premium users of the edge computing system to provide an output to the tenant that is dependent on the identification of the tenant.

12. The method of claim 1, further comprising using the telemetry to detect anomalies affecting the one or more computational processes executed by the tenant for the service.

13. An apparatus of an edge computing system, adapted to manage data for computational processes performed in the edge computing system, the apparatus comprising:
    network communication circuitry to communicate with a requesting entity; and
    processing circuitry to perform operations that:
    identify a computational processing request for a service offered in the edge computing system, wherein the computational processing request originates from a requesting entity connected to the edge computing system;
    determine an identification of the requesting entity based on the computational processing request;
    determine an identification of a tenant of the edge computing system to provide the service for the computational processing request;
    identify telemetry from servicing of the computational processing request, wherein the telemetry is produced by the tenant from one or more computational processes executed by the tenant for the service;
    associate the telemetry with the identification of the requesting entity and the identification of the tenant; and
    generate charging information to support billing of respective computational processes completed for the computational processing request, the charging information including at least a portion of the telemetry, the identification of the requesting entity, and the identification of the tenant;
    wherein generation of the charging information comprises prorating billing for the service by taking a fraction of utilizations reported by the telemetry, the fraction being determined based on percent of successful requests from an endpoint device completed within service level agreements (SLAs) available to the endpoint device and based on a portion of time used for which service quality of the service was acceptable under one of the SLAs.

14. The apparatus of claim 13, wherein the tenant is provided in a virtual device of a computing system of the edge computing system, wherein usage of the tenant is managed by the edge computing system, and wherein the charging information relates to resources predicted for, allocated for, or used by the computational processes of the tenant.

15. The apparatus of claim 13, the processing circuitry further to perform operations that:
    determine a billing charge to be assessed to the requesting entity based on the computational processes operated by the tenant and data provided in the telemetry, wherein the requesting entity is associated with one or more endpoint devices.

16. The apparatus of claim 15, wherein the billing charge is determined based on at least one of:
    a number of central processor unit cycles of a processing device used by the tenant for the computational processing request,
    a reserved time of a processing device used by the tenant for the computational processing request, or
    a subscription status for the endpoint device to use one or more services of an access network associated with the tenant.

17. The apparatus of claim 13, wherein the telemetry includes one or more of:
    network information relating to bandwidth utilization, collision rate, latency, or jitter;
    hosting environment information relating to resource utilization, CPU, memory, storage, I/O, or power; or
    management service information relating to orchestration, device lifecycle, security, or software update.

18. The apparatus of claim 13, the processing circuitry to perform further operations that:
    transmit a cost estimate to the requesting entity based on the computational processing request and a subscription status of the requesting entity in relation to services of an access network used by the requesting entity;
    receive a confirmation from the requesting entity to perform the computational processing request based on the cost estimate; and
    forward the computational processing request to the tenant, in response to the confirmation to perform the computational processing request.

19. At least one non-transitory machine-readable storage medium, comprising a plurality of instructions adapted for managing data for computational processes in an edge computing system, wherein the instructions, responsive to being executed with processor circuitry of an apparatus of the edge computing system, cause the processor circuitry to perform operations that:
    identify a computational processing request for a service offered in the edge computing system, wherein the computational processing request originates from one or multiple edge devices connected to the edge computing system;
    determine an identification of the one or multiple edge devices based on the computational processing request;
    determine an identification of a tenant of the edge computing system to provide the service for the computational processing request;
    identify telemetry from servicing of the computational processing request, wherein the telemetry is produced by the tenant from one or more computational processes executed by the tenant for the service;
    associate the telemetry with the identification of the one or multiple edge devices and the identification of the tenant; and
    generate charging information to support billing of respective computational processes completed for the computational processing request, the charging information including at least a portion of the telemetry, the identification of the one or multiple edge devices, and the identification of the tenant; and
    wherein generation of the charging information comprises prorating billing for the service by taking a fraction of utilizations reported by the telemetry, the fraction being determined based on percent of successful requests from an endpoint device completed within service level agreements (SLAs) available to the endpoint device and based on a portion of time used for which service quality of the service was acceptable under one of the SLAs.

20. The machine-readable storage medium of claim 19, wherein the tenant is provided in a virtual device of a computing system of the edge computing system, wherein usage of the tenant is managed by the edge computing system, and wherein the charging information relates to resources predicted for, allocated for, or used by the computational processes of the tenant.

21. The machine-readable storage medium of claim 19, wherein the instructions further cause the processor circuitry to perform operations that:
   determine a billing charge to be assessed to the one or multiple edge devices based on the computational processes operated by the tenant and data provided in the telemetry.

22. The machine-readable storage medium of claim 21, wherein the billing charge is determined based on at least one of:
   a number of central processor unit cycles of a processing device used by the tenant for the computational processing request,
   a reserved time of a processing device used by the tenant for the computational processing request, or
   a subscription status for the endpoint device to use one or more services of an access network associated with the tenant.

23. The machine-readable storage medium of claim 19, wherein the telemetry includes one or more of:
   network information relating to bandwidth utilization, collision rate, latency, or jitter;
   hosting environment information relating to resource utilization, CPU, memory, storage, I/O, or power; or
   management service information relating to orchestration, device lifecycle, security, or software update.

24. The machine-readable storage medium of claim 19, wherein the instructions further cause the processor circuitry to perform operations that:
   transmit a cost estimate to the one or multiple edge devices based on the computational processing request and a subscription status of the one or multiple edge devices in relation to services of an access network used by the one or multiple edge devices;
   receive a confirmation from the one or multiple edge devices to perform the computational processing request based on the cost estimate; and
   forward the computational processing request to the tenant, in response to the confirmation to perform the computational processing request.

* * * * *